US010858580B2

(12) United States Patent
Hiejima et al.

(10) Patent No.: US 10,858,580 B2
(45) Date of Patent: Dec. 8, 2020

(54) METHOD OF MANUFACTURING LUMINESCENT NANOCARBON

(71) Applicant: NISSAN CHEMICAL INDUSTRIES, LTD., Tokyo (JP)

(72) Inventors: Yusuke Hiejima, Kanazawa (JP); Hiromichi Hayashi, Sendai (JP); Mitsuhiro Kanakubo, Sendai (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 362 days.

(21) Appl. No.: 15/755,359

(22) PCT Filed: Aug. 24, 2016

(86) PCT No.: PCT/JP2016/074670
§ 371 (c)(1),
(2) Date: Feb. 26, 2018

(87) PCT Pub. No.: WO2017/033973
PCT Pub. Date: Mar. 2, 2017

(65) Prior Publication Data

US 2018/0244991 A1 Aug. 30, 2018

(30) Foreign Application Priority Data

Aug. 25, 2015 (JP) ................................ 2015-165822

(51) Int. Cl.
*C09K 11/65* (2006.01)
*B82Y 30/00* (2011.01)
(Continued)

(52) U.S. Cl.
CPC .............. *C09K 11/65* (2013.01); *B82Y 30/00* (2013.01); *B82Y 40/00* (2013.01); *C09K 11/08* (2013.01)

(58) Field of Classification Search
CPC .. C09K 11/65; Y10S 977/734; Y10S 977/774; Y10S 977/778; Y10S 977/814; B82Y 20/00; B82Y 40/00
See application file for complete search history.

(56) References Cited

FOREIGN PATENT DOCUMENTS

CN 102849722 * 1/2013
CN 102849722 A 1/2013
(Continued)

OTHER PUBLICATIONS

Hiejima et al, "Synthesis of carbon dots using microreaction field by electrospray", SCEJ 78th Annual Meeting, Feb. 2013, 4 pages.*
(Continued)

*Primary Examiner* — C Melissa Koslow
(74) *Attorney, Agent, or Firm* — Hamre, Schumann, Mueller & Larson, P.C.

(57) ABSTRACT

An object is to provide a method of manufacturing luminescent nanocarbon with which the luminescent nanocarbon can be efficiently manufactured in large amounts. This method is to manufacture luminescent nanocarbon (Product) from a raw material aqueous solution that contains a carbon source compound and a nitrogen source compound. This method includes a reaction step of heating the raw material aqueous solution from a storage container (Reservoir) in a heating section (Furnace) to react the raw material aqueous solution at a reaction temperature of 100° C. or higher and 500° C. or lower and a cooling step of cooling a reaction solution that contains a reaction product generated in the reaction step. The cooling step is carried out in a bath (Ice bath).

7 Claims, 18 Drawing Sheets

(51) Int. Cl.
*B82Y 40/00* (2011.01)
*C09K 11/08* (2006.01)

(56) References Cited

FOREIGN PATENT DOCUMENTS

| | | | | |
|---|---|---|---|---|
| CN | 102976311 | A | | 3/2013 |
| CN | 103011126 | A | | 4/2013 |
| CN | 103045242 | | * | 4/2013 |
| CN | 103387831 | A | | 11/2013 |
| CN | 104164232 | | * | 11/2014 |
| CN | 104531147 | A | | 4/2015 |
| CN | 104726098 | A | | 6/2015 |
| CN | 105542764 | | * | 5/2016 |
| EP | 2883835 | A1 | | 6/2015 |
| JP | 2015-67509 | A | | 4/2015 |
| WO | 97/49484 | | | 12/1997 |
| WO | 2012/016296 | A1 | | 2/2012 |
| WO | 2012/173262 | | | 12/2012 |
| WO | 2014/023097 | A1 | | 2/2014 |
| WO | WO 2014/193089 | | * | 12/2014 |

OTHER PUBLICATIONS

Translation for WO 2014/193089 (identified as KR 101403534), Dec. 4, 2014.*

Translation of CN 104164232, Nov. 26, 2014.*

Translation for CN 103045242, Apr. 17, 2013.*

Translation for CN 105542764, May 4, 2016.*

Kang et al, "Carbon Quantum Dots for Zebrafish Fluoresence Imaging", Scienctific Reports, 5, 11835, pp. 1-21, Jul. 2, 2015.*

Extended European Search Report; European Patent Application No. 16839320.5; dated Mar. 8, 2019 (7 pages).

Office Action; TW patent application No. 105127135; dated Dec. 23, 2019; with machine translation (10 pages).

Hiejima et al., "Synthesis of carbon dots using micro reaction filed by electrospray" The SCEJ 78th Annual Meeting, O31 9 with English translation, 4 pages (2013).

Borra et al., "Bipolar coagulation for powder production: micro-mixing inside droplets", J. Aerosol. Sci., vol. 30, No. 7, pp. 945-958 (1999).

International Search Report and Written Opinion; International Patent Application No. PCT/JP2016/074670, dated Oct. 4, 2016, with English translation (12 pages).

Office Action, Japanese Patent Application No. 2016-163377, dated Jun. 30, 2020, with machine translation (10 pages) (Cited reference CN 103387831 having been previously presented in the IDS).

Office Action, Chinese Patent Application No. 201680048738.2, dated Jun. 10, 2020, with machine translation (16 pages).

Kang et al., "Carbon Quantum Dots for Zebrafish Fluorescence Imaging", Scientific Reports, 5, 11835, dated Jul. 2, 2015 (12 pages).

Feng et al., "Synthesis, Characterization and Cell Imaging Application of Nitrogen-doped Carbon Quantum Dots", Journal of Materials Science & Engineering, vol. 33, No. 1, Feb. 2015, with English abstract.

Synthesis and Process Investigation of Group II-VI Composite Structured Quantum Dots via Microreaction, May 21, 2011 with machine translation of cited paragraph.

Decision of Refusal, Taiwanese Patent application No. 105127135, dated Apr. 22, 2020, with machine translation (7 pages).

Office Action issued in the corresponding European Patent Application No. 16839320.5, 6 pages, dated May 12, 2020.

* cited by examiner

[FIG. 1]
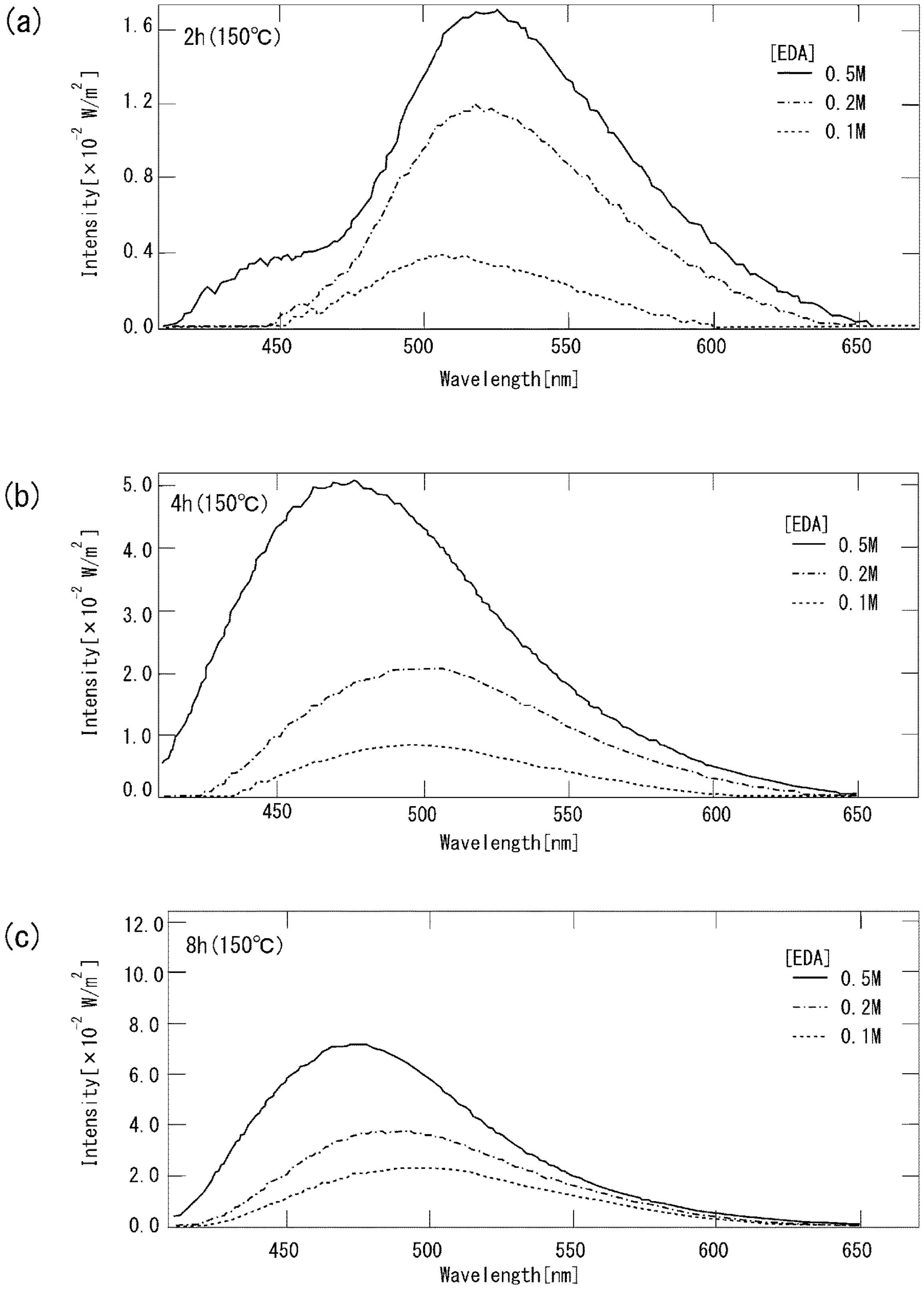

[FIG. 2]
(a)
(b)
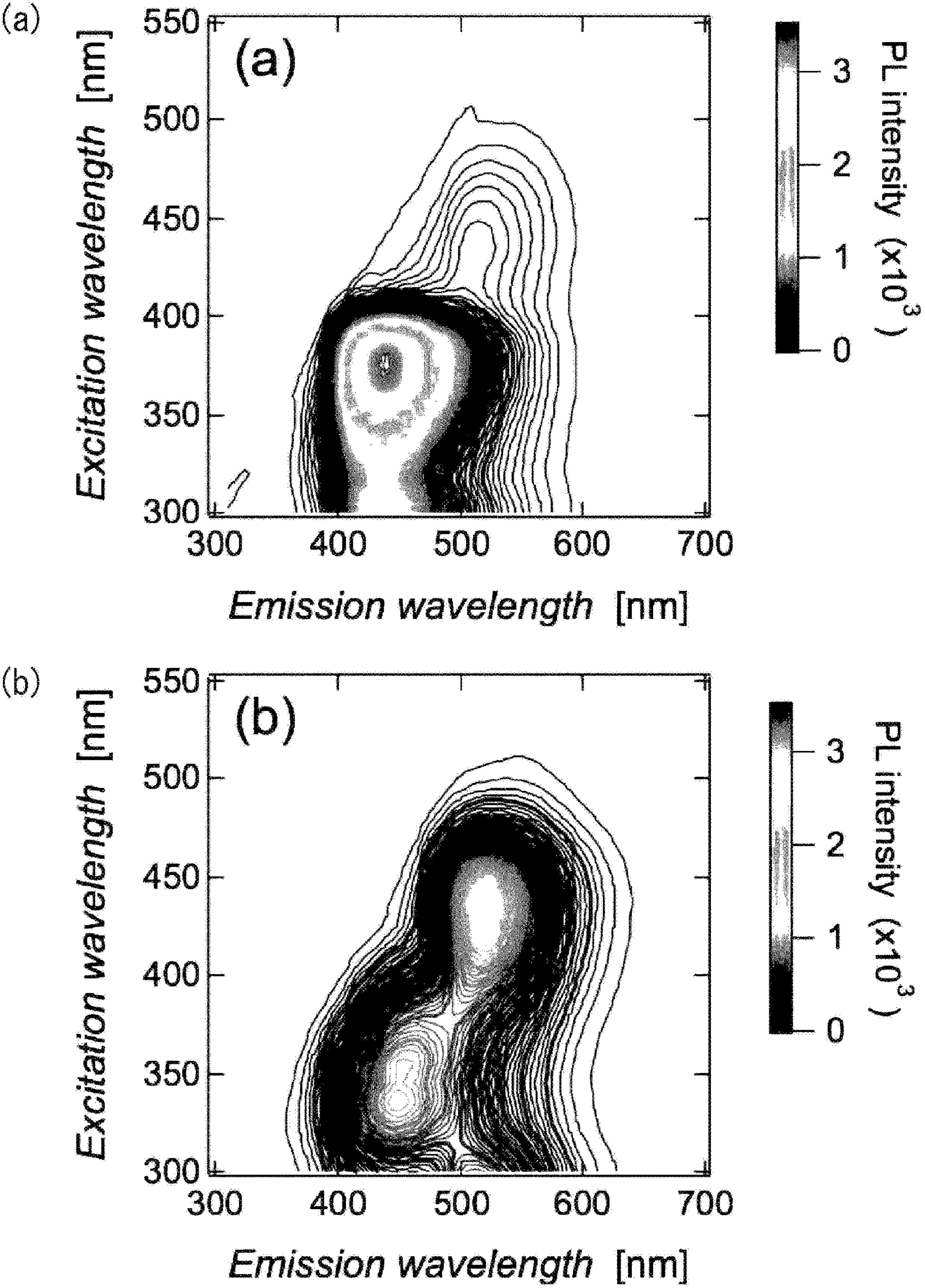

[FIG. 3]
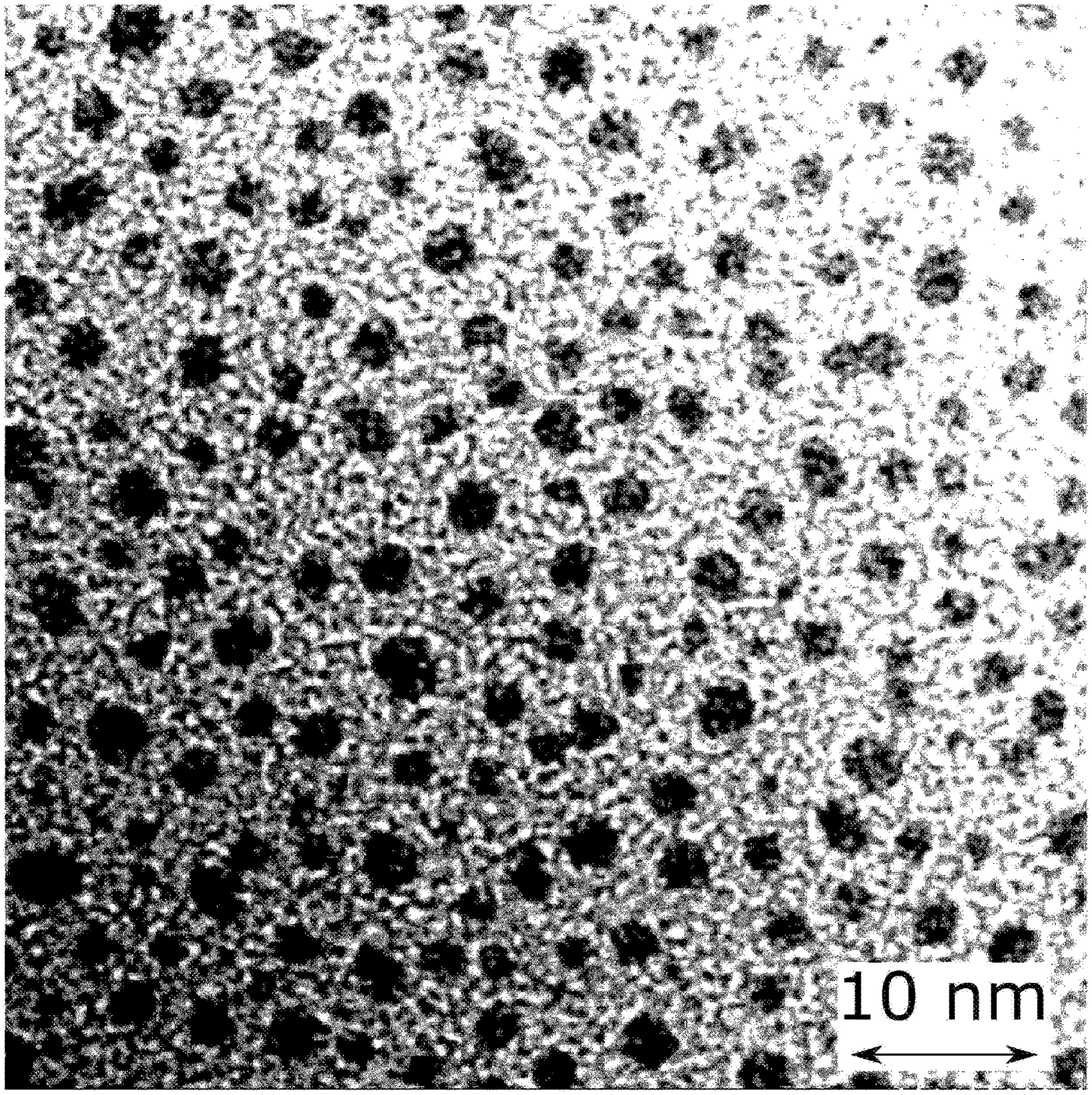

[FIG. 4]
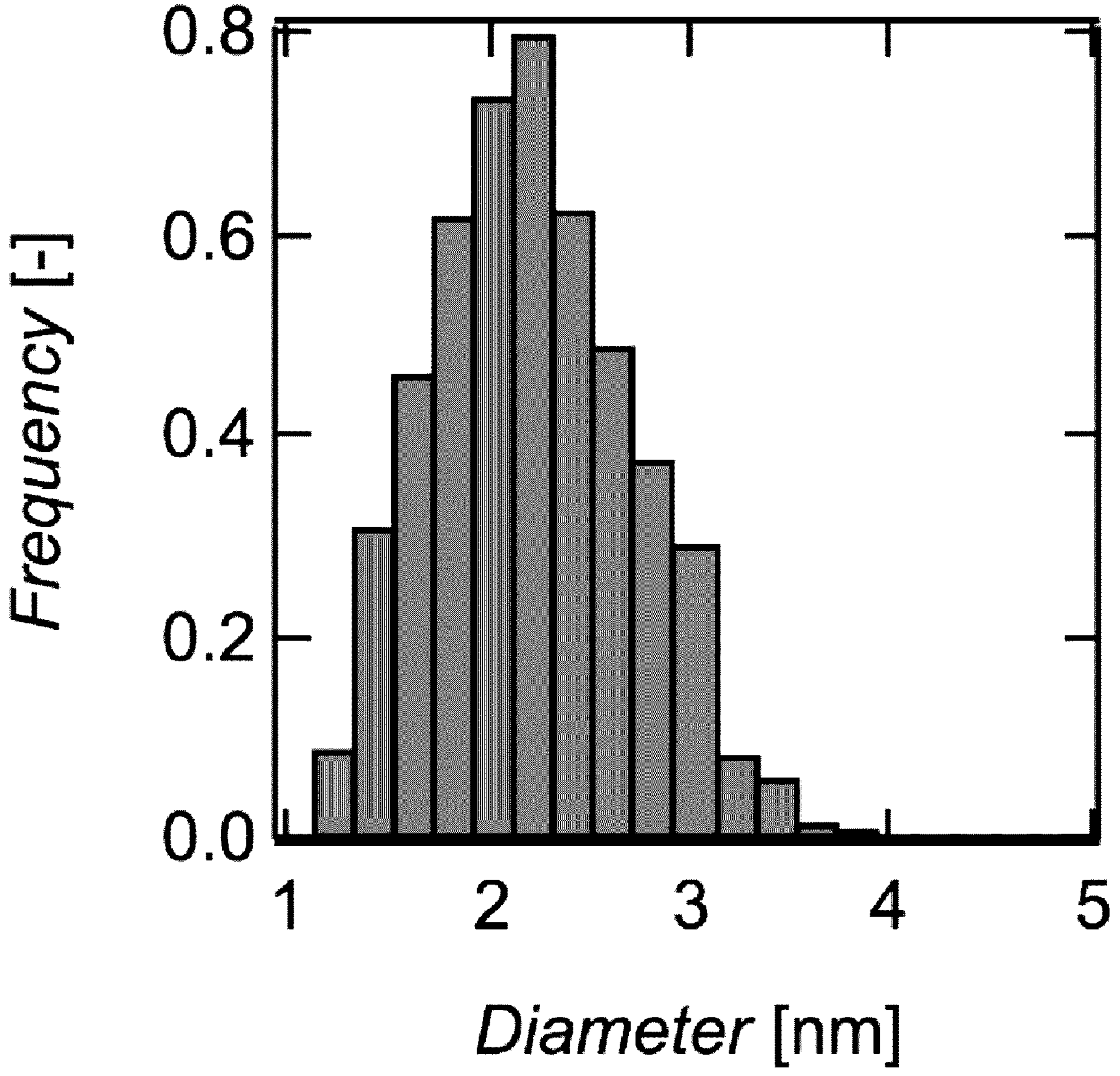

[FIG. 5]
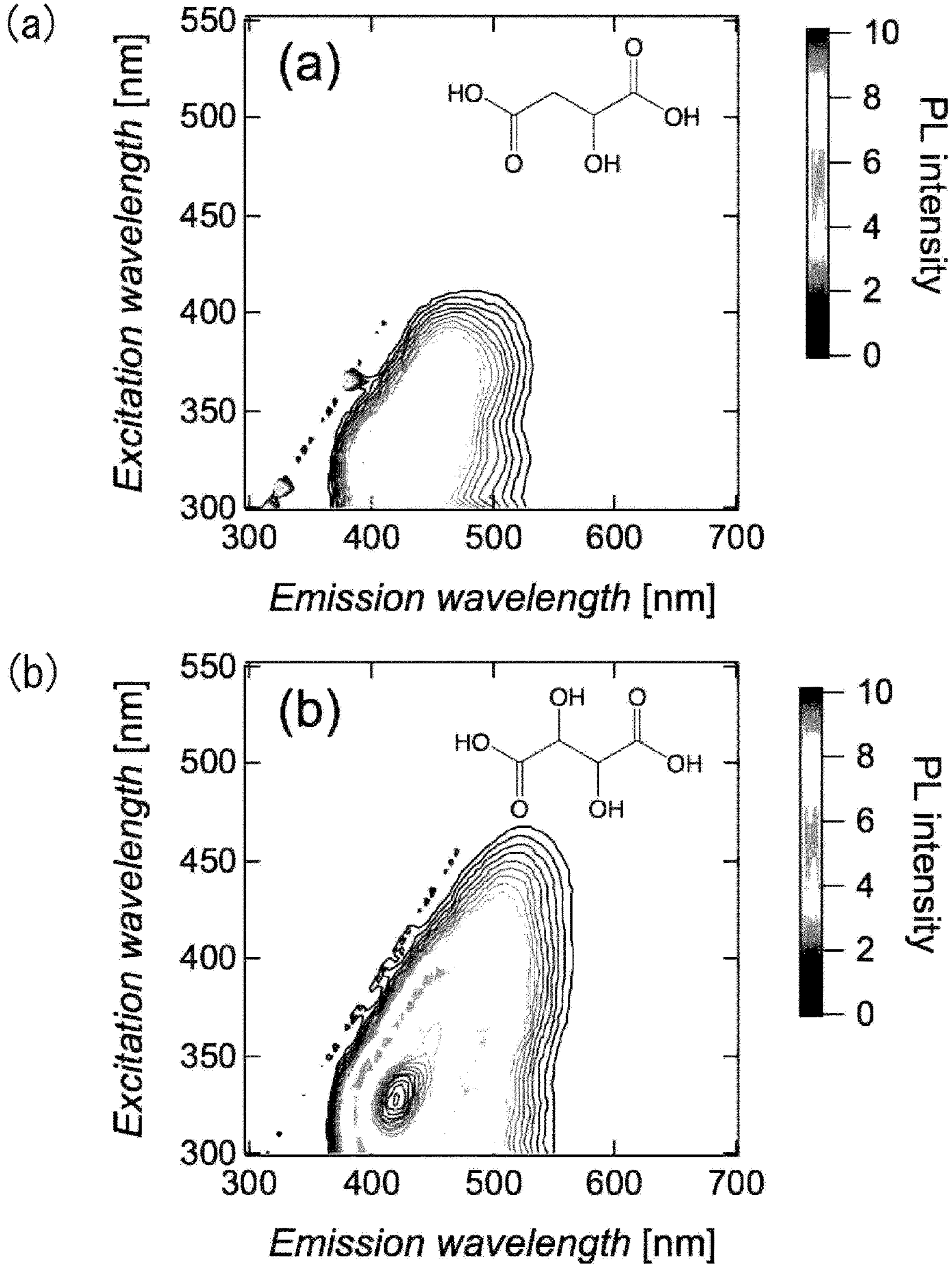

[FIG. 6]
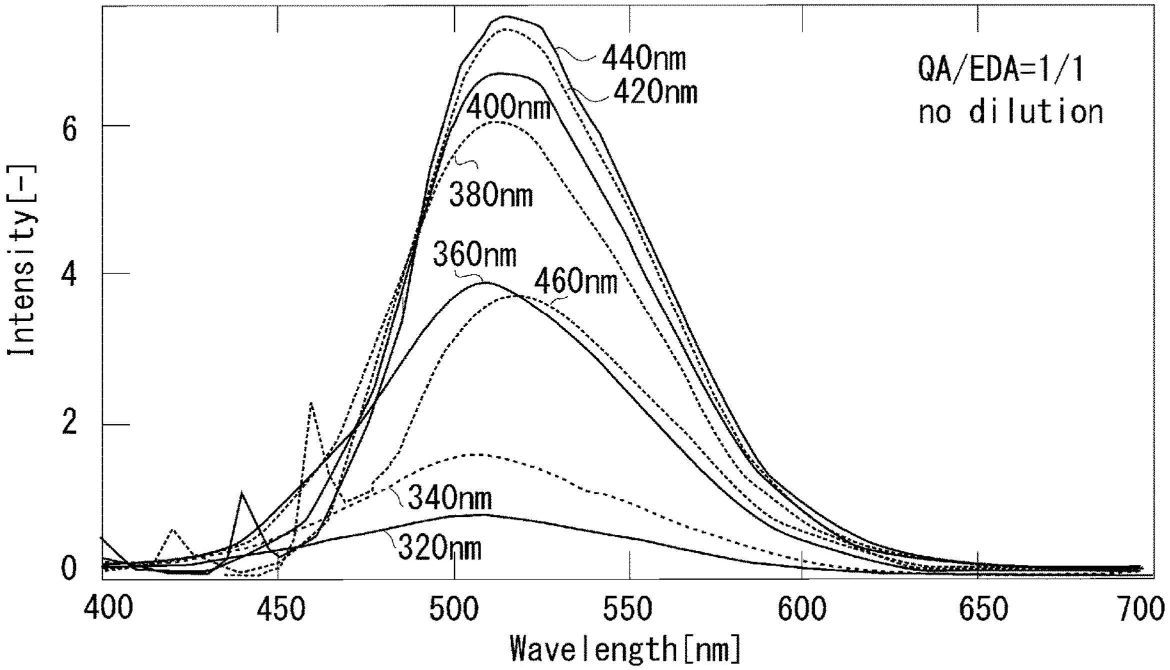

[FIG. 7]
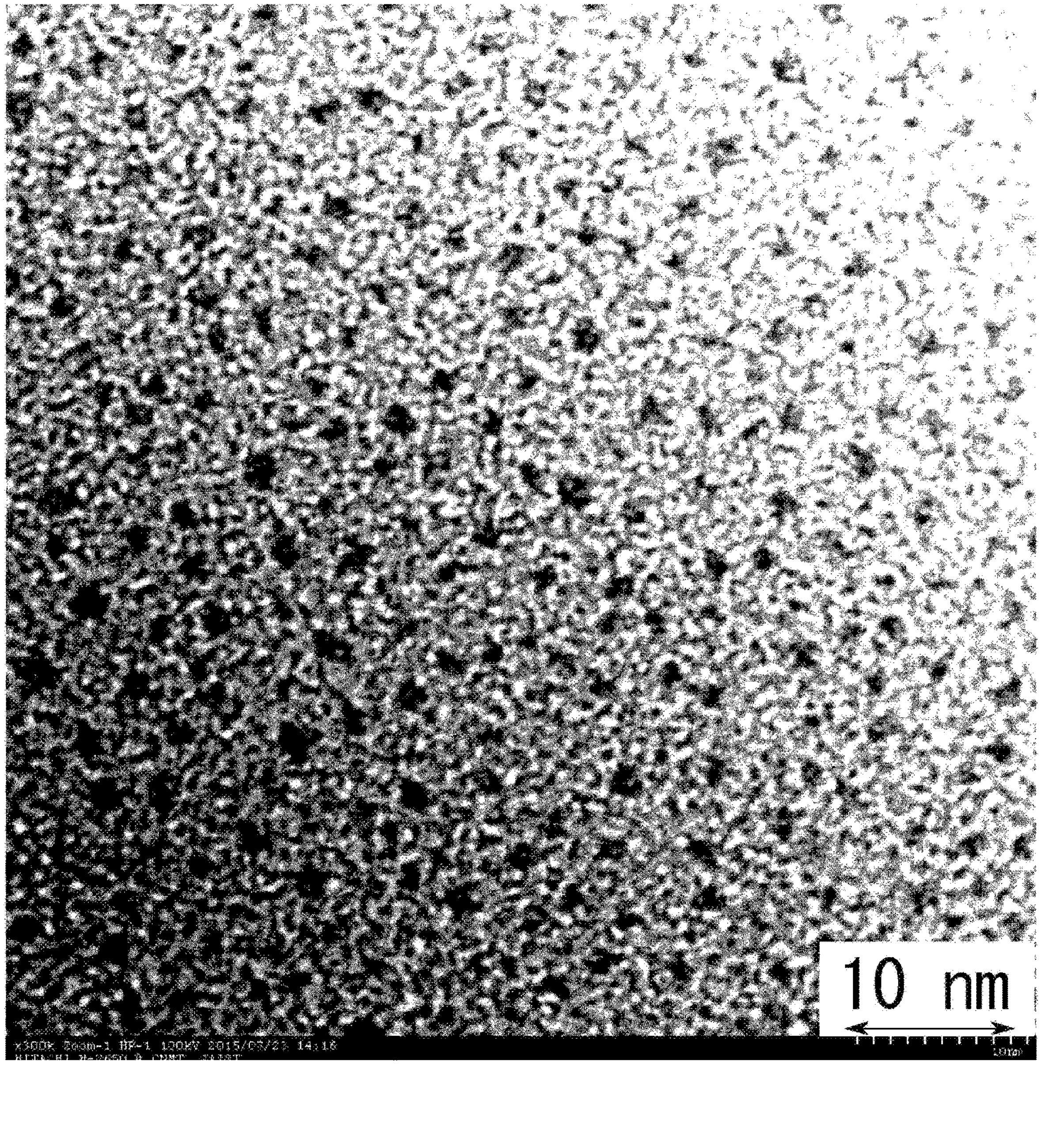

[FIG. 8]
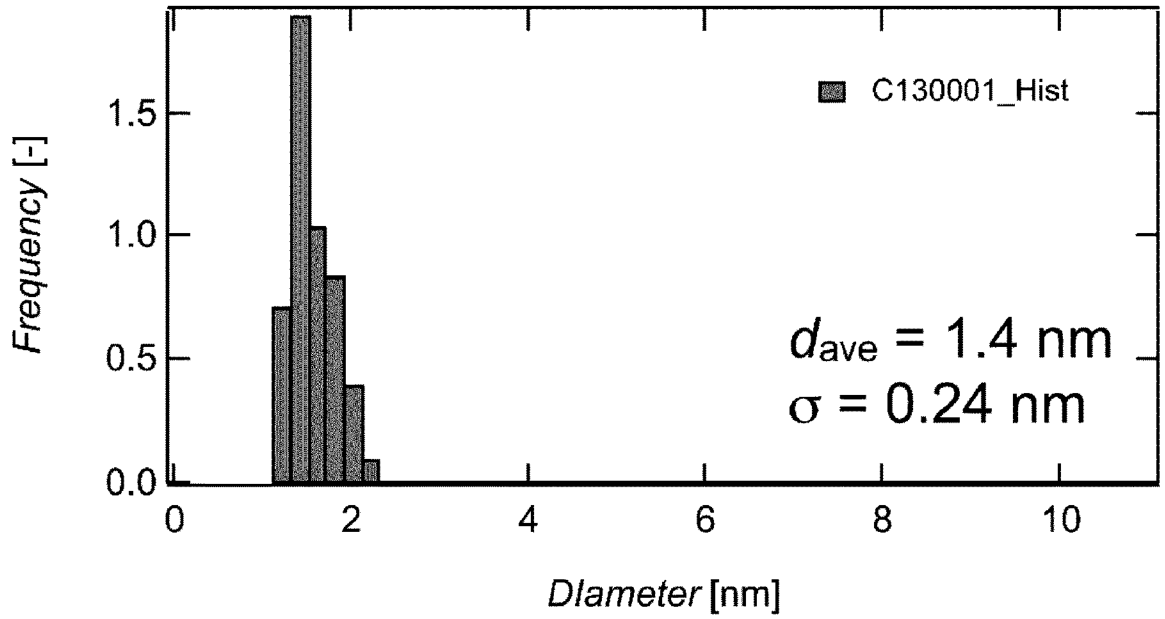
[FIG. 9]
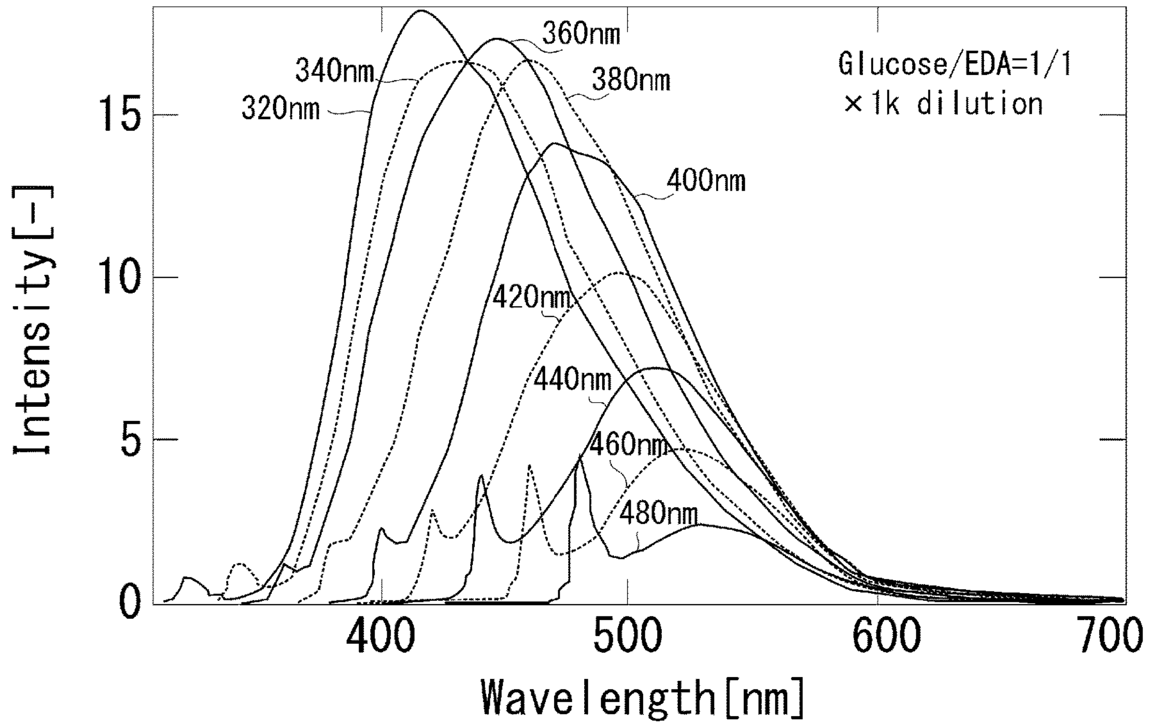

[FIG. 10]
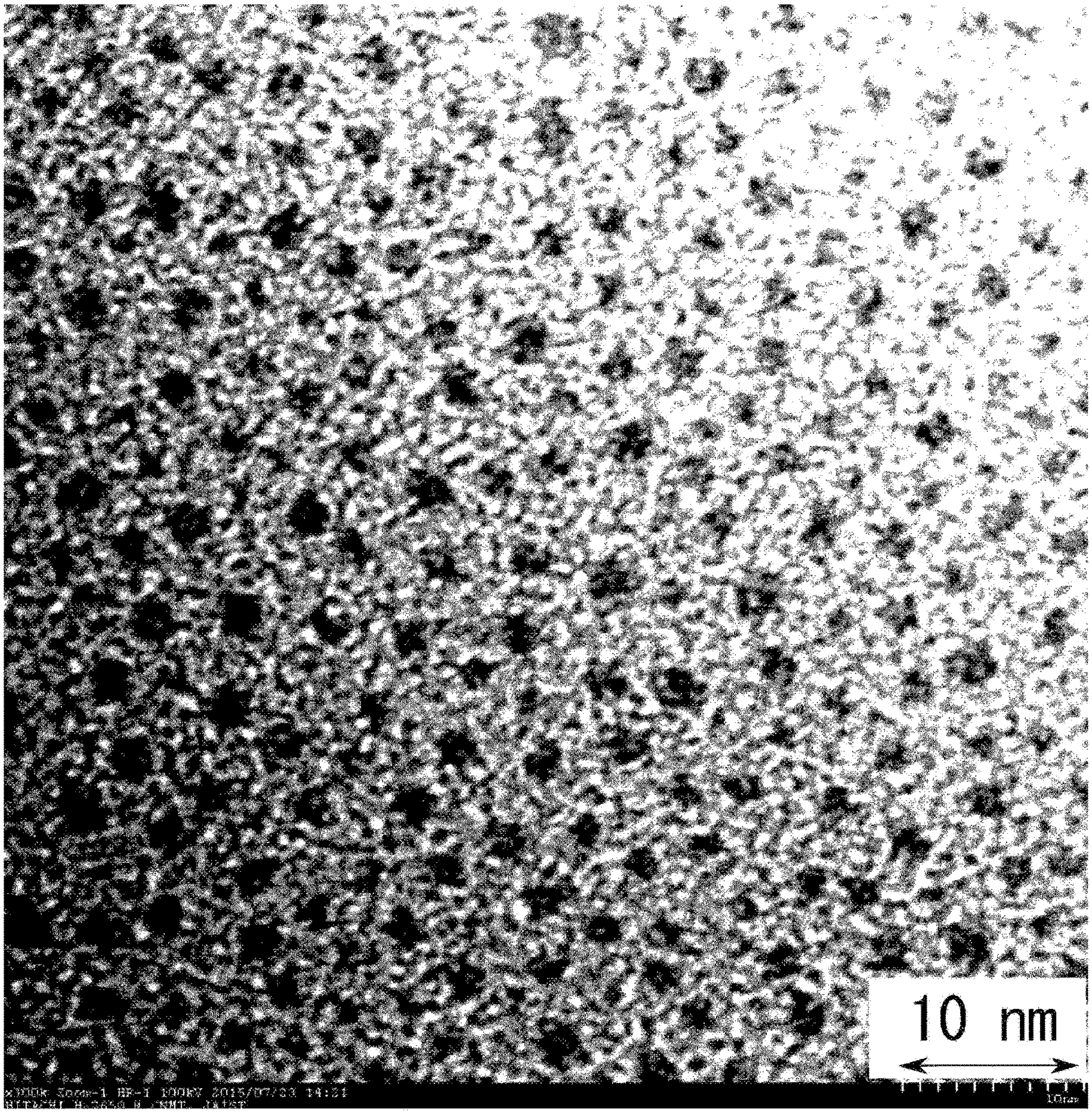

[FIG. 11]
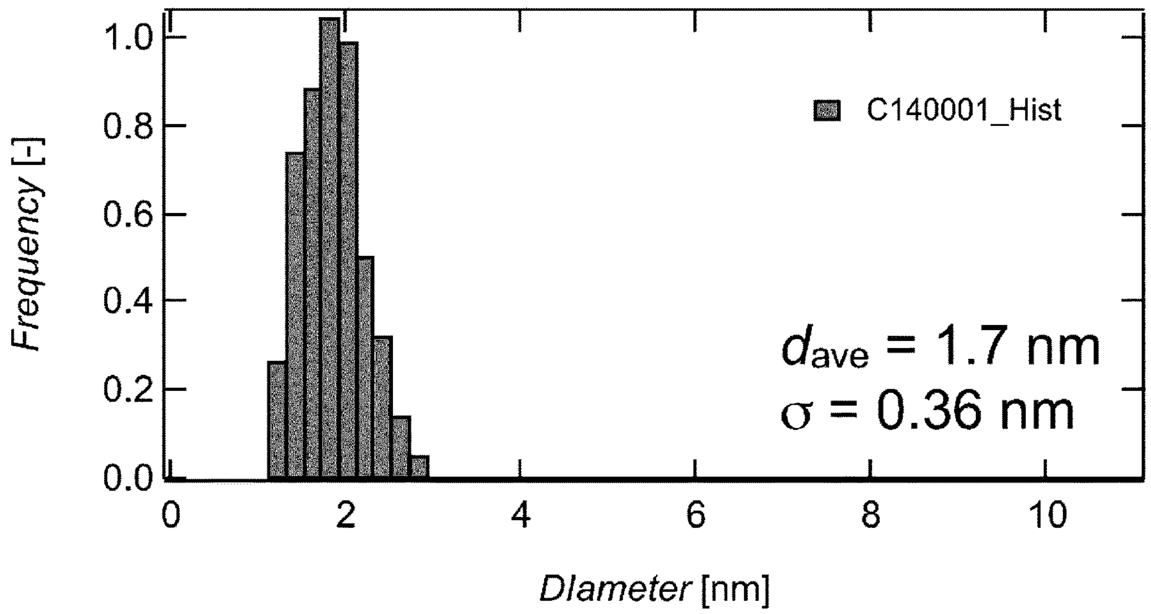

[FIG. 12]
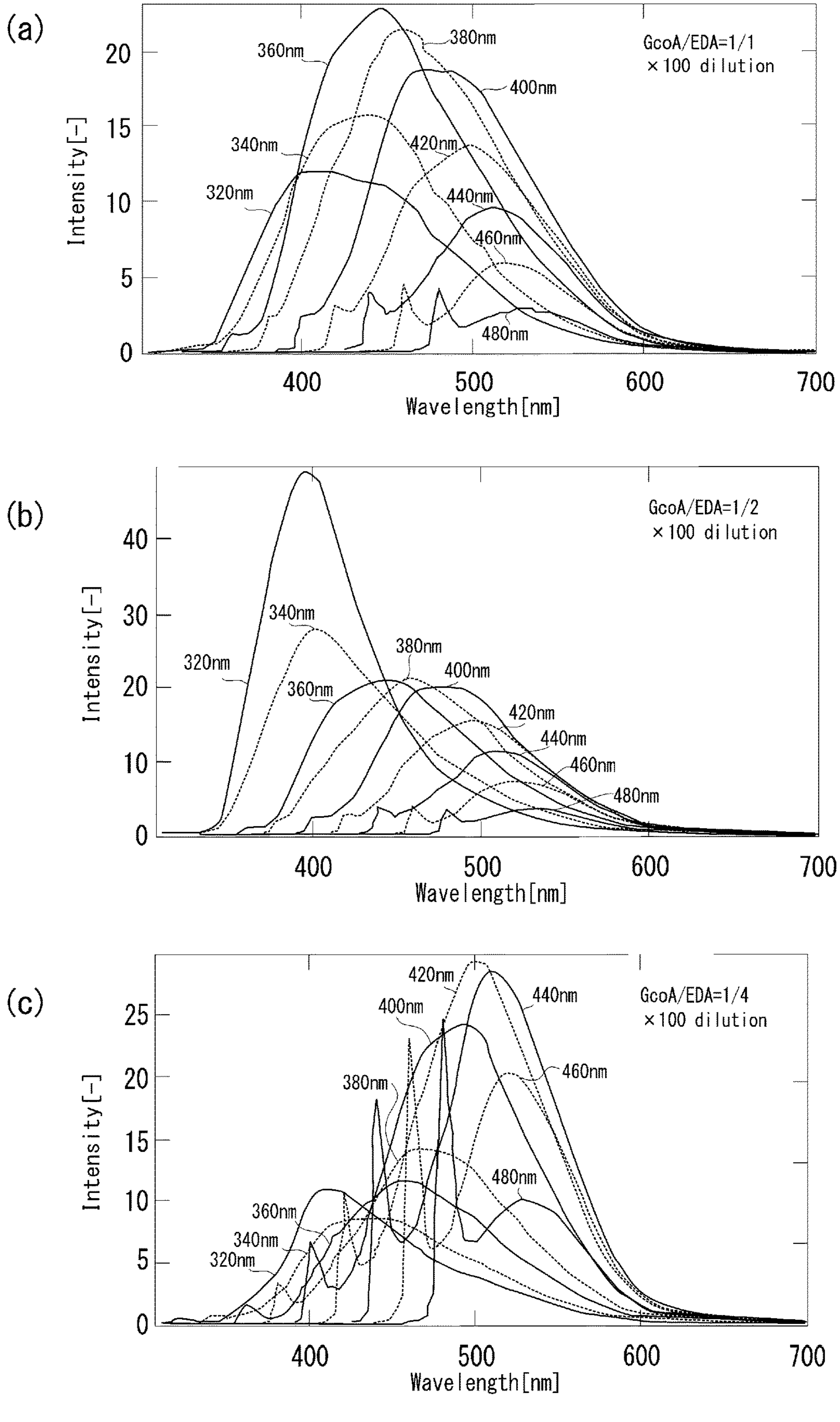

[FIG. 13]
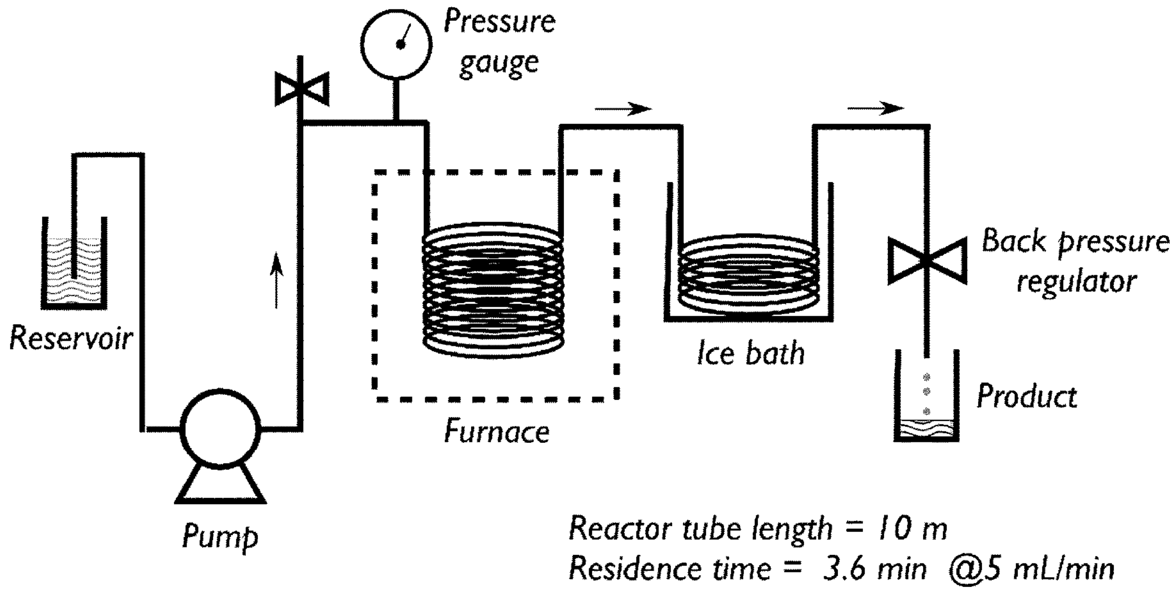
[FIG. 14]
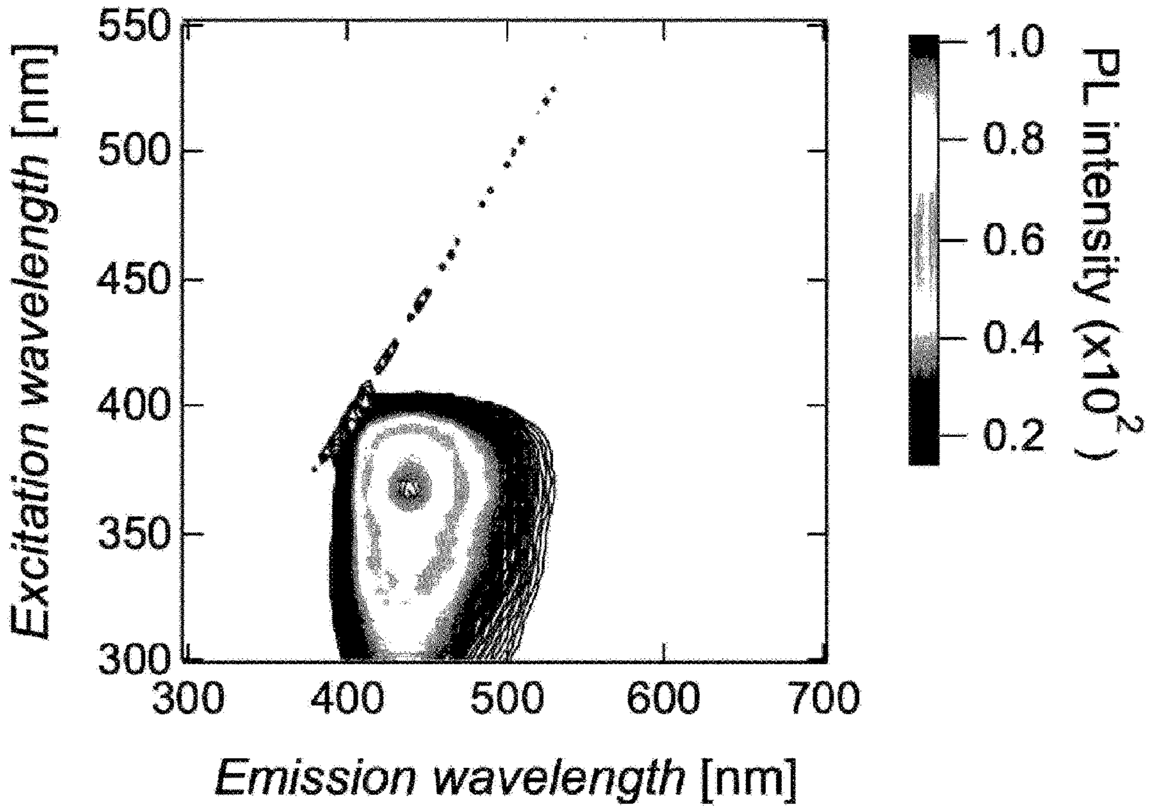

[FIG. 15]
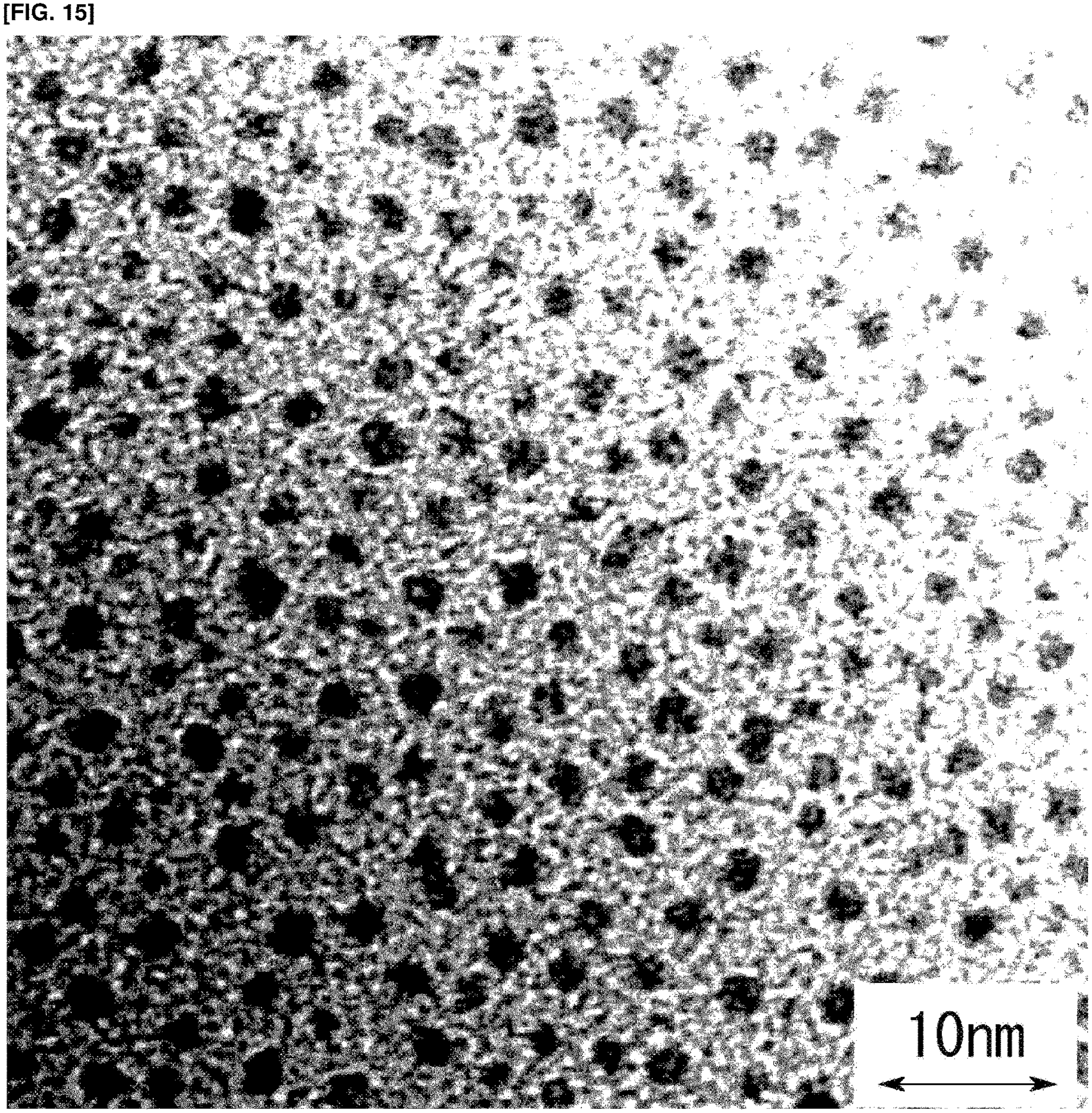

[FIG. 16]
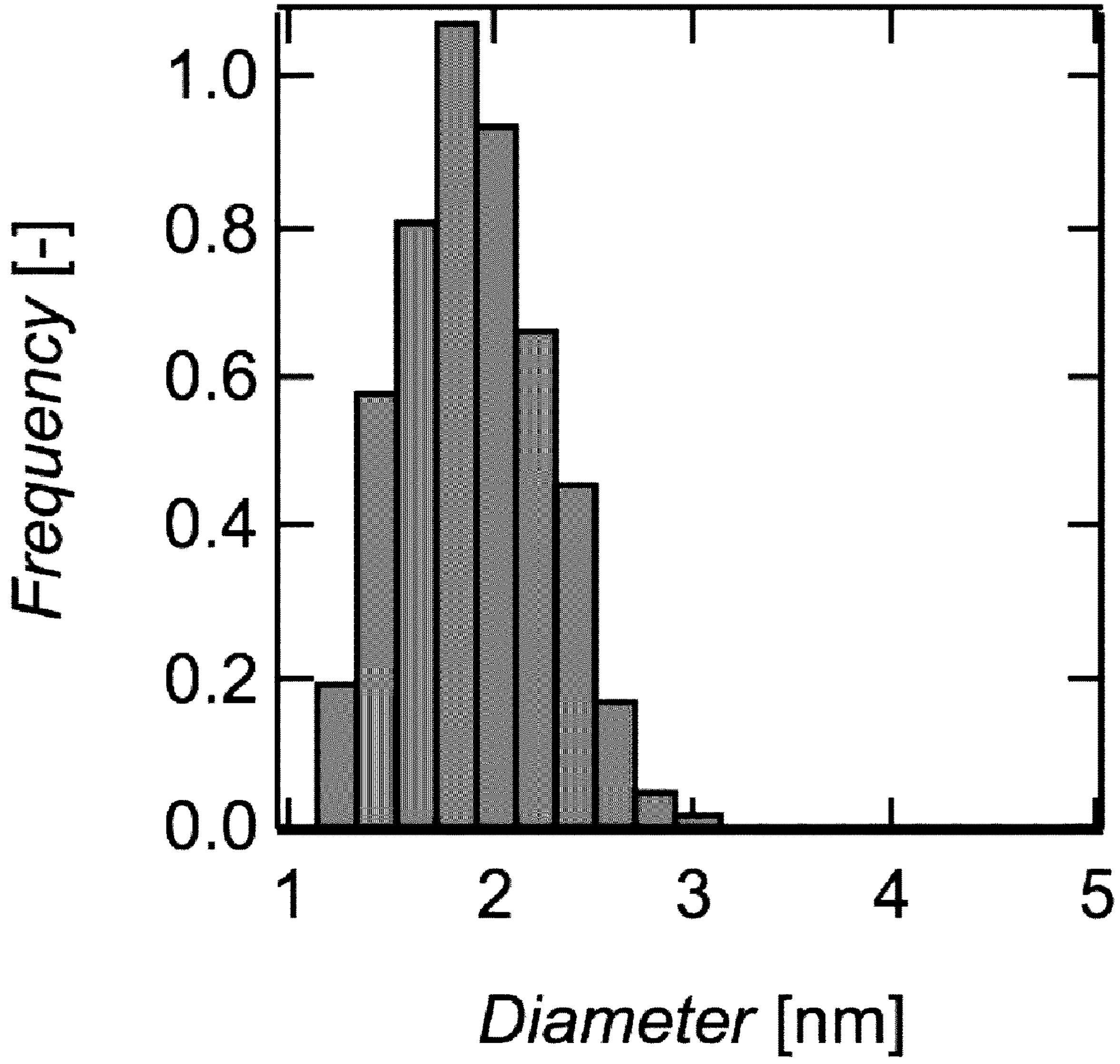

[FIG. 17]
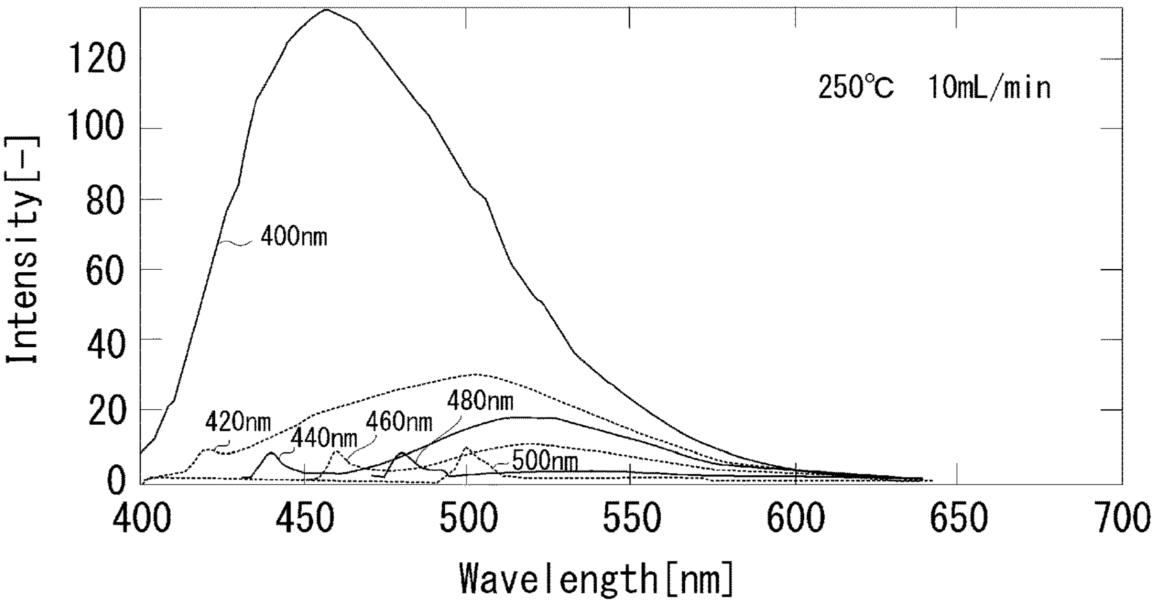
[FIG. 18]
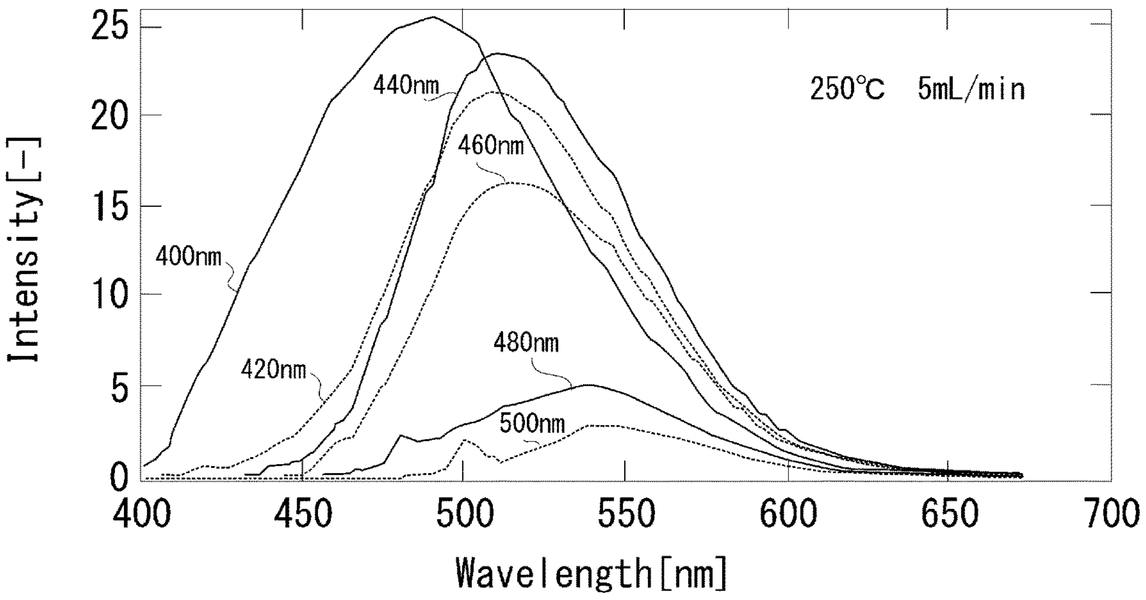

[FIG. 19]
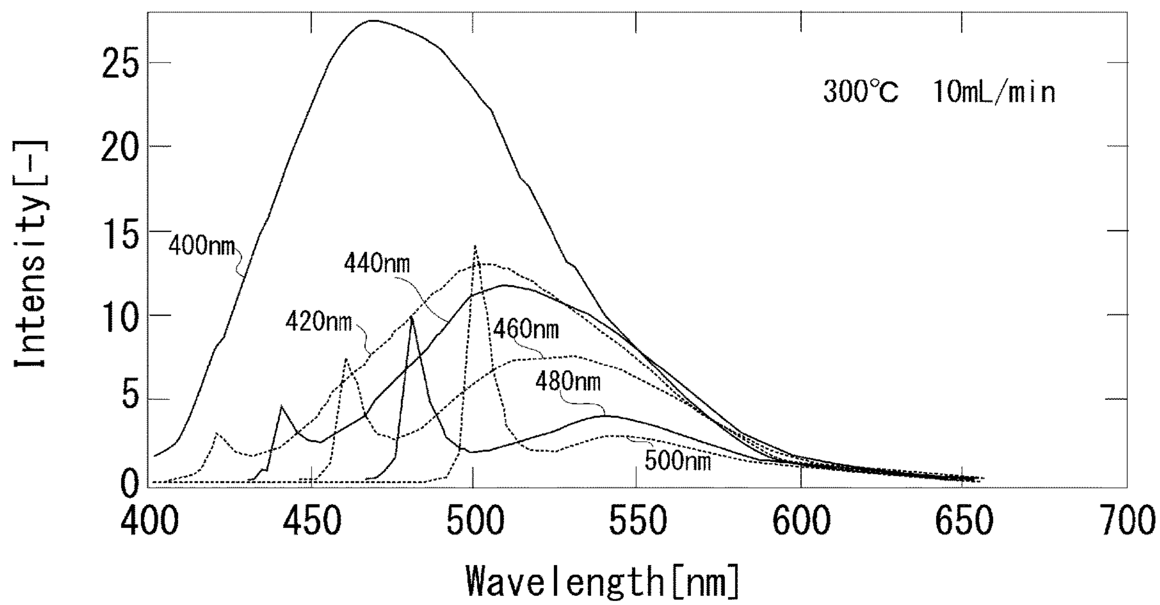
[FIG. 20]
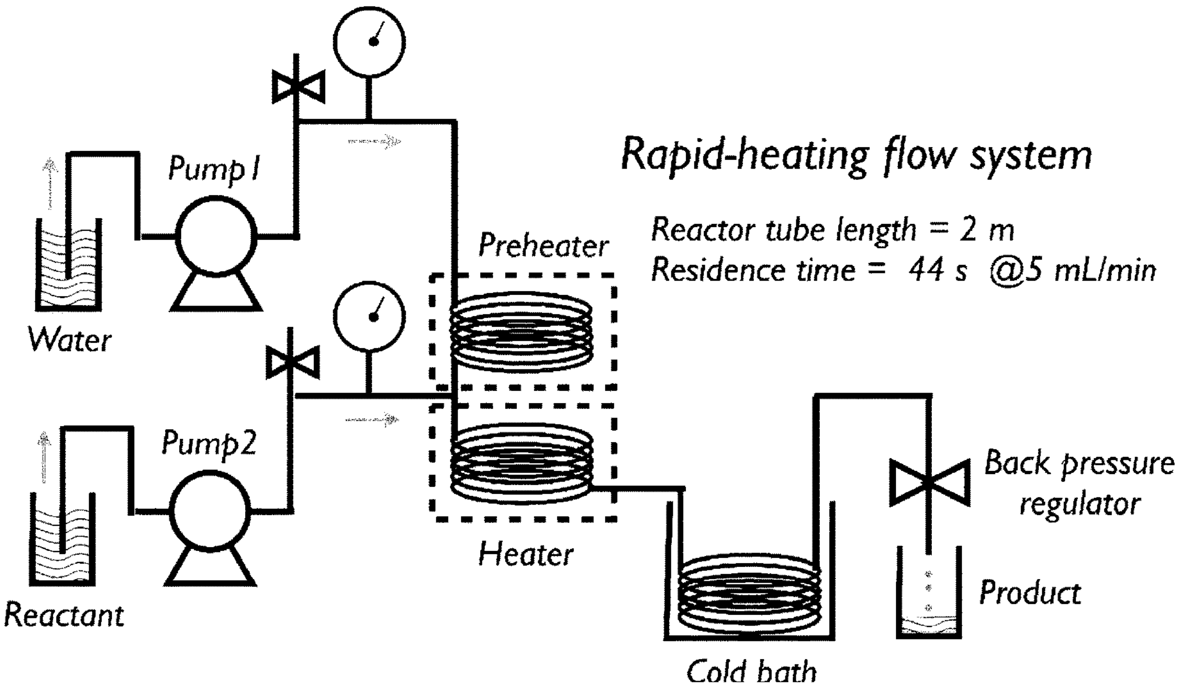

[FIG. 21]
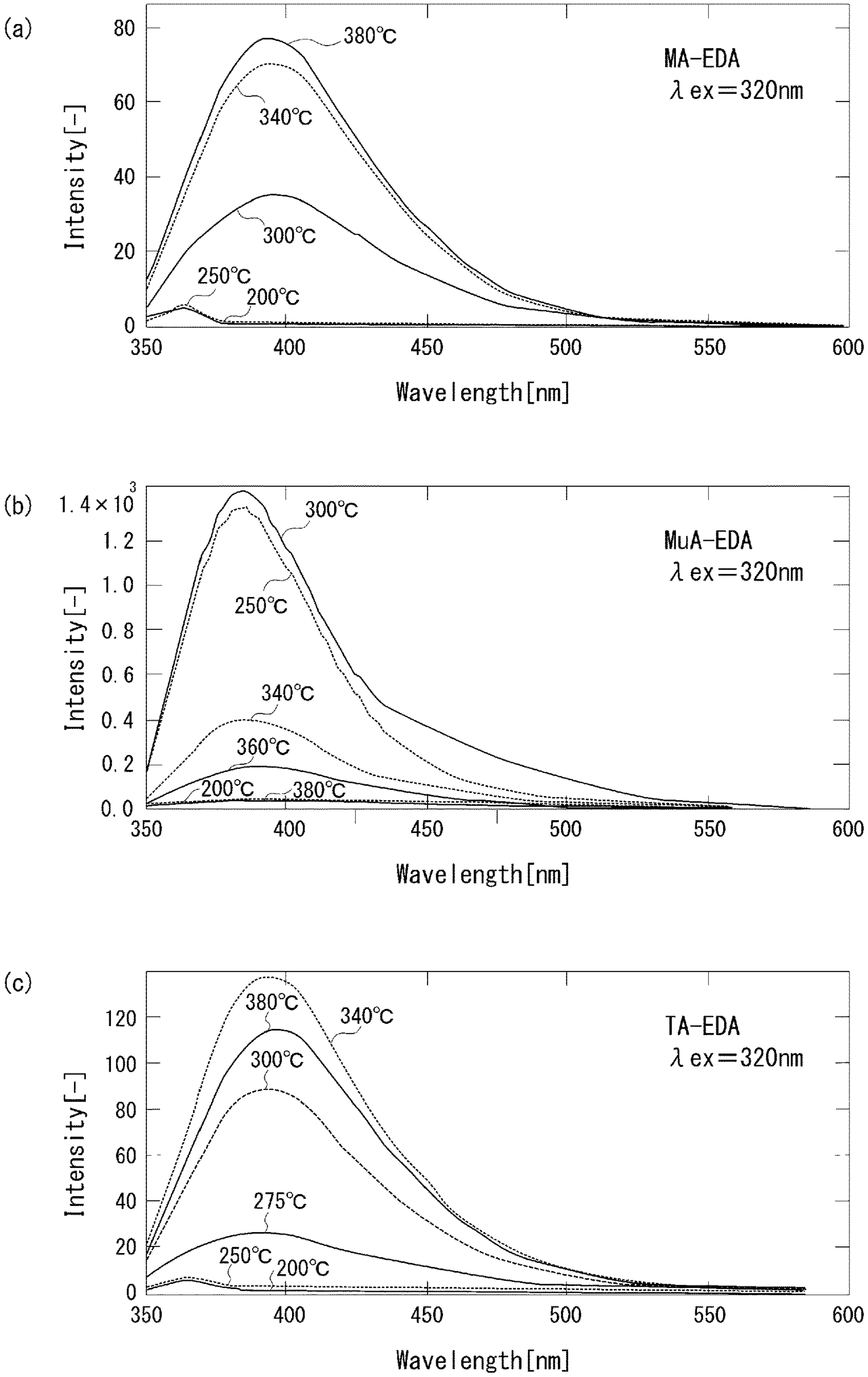

[FIG. 22]
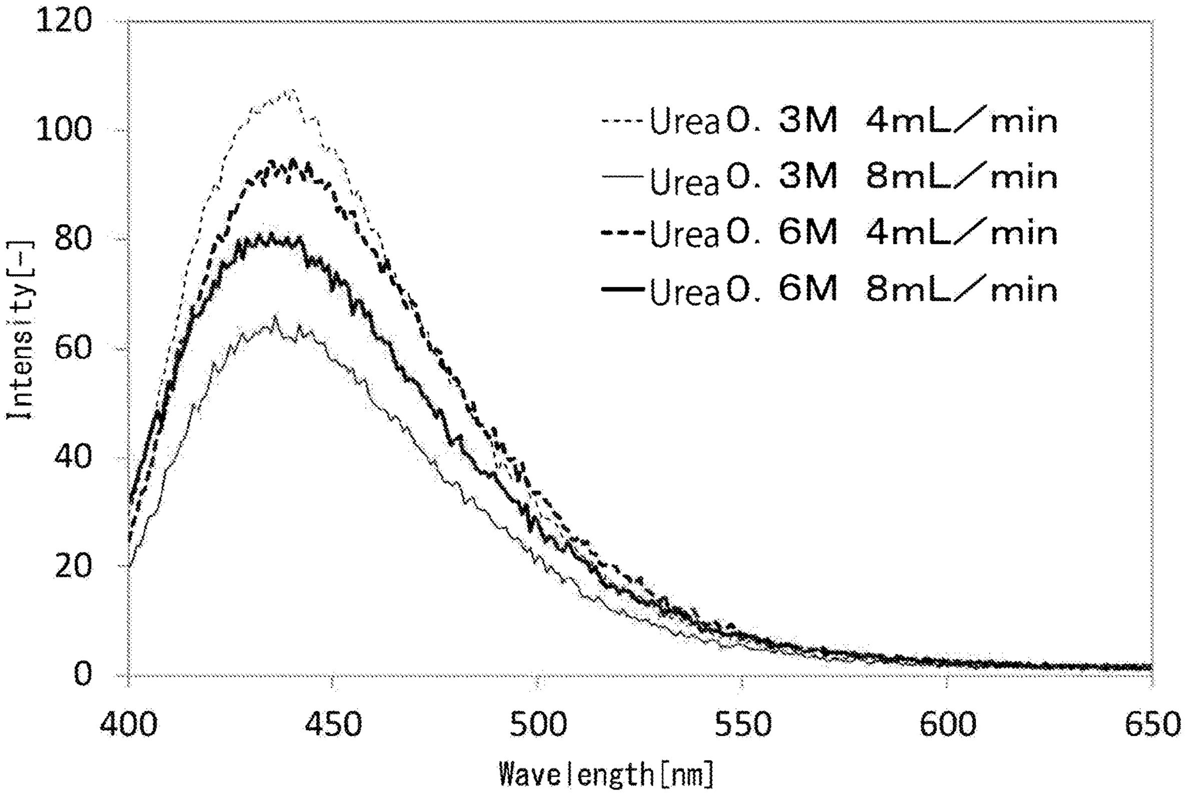

METHOD OF MANUFACTURING LUMINESCENT NANOCARBON

TECHNICAL FIELD

The present invention relates to a method of manufacturing luminescent nanocarbon that is synthesized from a carbon source compound and a nitrogen source compound as raw materials.

BACKGROUND ART

Luminescent nanocarbon (carbon dots) is a novel carbon nanomaterial that has been recently discovered in soot. Unlike graphene and other nanocarbon materials, the luminescent nanocarbon has a feature of exhibiting strong luminescence. Moreover, materials used as the carbon source compounds are organic molecules rather than materials of highly toxic cadmium compounds such as cadmium sulfide (CdS) and cadmium selenide (CdSe) and rare metals such as europium which are used in semiconductor quantum dots. For these reasons, the luminescent nanocarbon attracts attention as a novel luminescent material capable of replacing semiconductor quantum dots which may have toxicity.

In recent years, various methods of synthesizing the luminescent nanocarbon have been reported. Examples of such methods include a method of chemically processing soot synthesized in a gas phase and a batch method of synthesizing luminescent nanocarbon using a reaction in a liquid phase. The inventors of the present invention have proposed a method of synthesizing luminescent nanocarbon using a micro reaction field forming apparatus (Patent Literature 1) that utilizes electrostatic interaction between micro-droplets synthesized by electrospray (electrostatic spraying) (Non-Patent Literature 1). Another method has also been proposed for manufacturing an inorganic oxide fine particle powder using an apparatus similar to the above micro reaction field forming apparatus described in Patent Literature (Patent Literature 2, Non-Patent Literature 2).

PRIOR ART LITERATURE

Patent Literature

[Patent Literature 1] WO2012/173262
[Patent Literature 2] WO97/49484

Non-Patent Literature

[Non-Patent Literature 1] Hiejima et al., The SCEJ 78th Annual Meeting, O319 (2013)
[Non-Patent Literature 2] Borra et al, J. Aerosol. Sci., 30, 945 (1999)

SUMMARY OF THE INVENTION

Problems to be Solved by the Invention

However, the conventional manufacturing method using a micro reaction field forming apparatus has a problem in that the luminescent nanocarbon cannot be efficiently manufactured in large amounts.

An object of the present invention is therefore to provide a method of manufacturing luminescent nanocarbon with which the luminescent nanocarbon can be efficiently manufactured in large amounts.

Means for Solving the Problems

In an aspect of the present invention, there is provided a method of manufacturing luminescent nanocarbon from a raw material aqueous solution that contains a carbon source compound and a nitrogen source compound. This method includes a hydrothermal reaction of heating the raw material aqueous solution in a reaction container to react the raw material aqueous solution at a reaction temperature of 100° C. or higher and 500° C. or lower under high pressure and a cooling step of cooling a reaction solution that contains a reaction product generated in the hydrothermal reaction.

Effect of the Invention

According to the present invention, the carbon source compound and nitrogen source compound in the raw material aqueous solution may be reacted in water at high temperature and high pressure and the luminescent nanocarbon can thereby be efficiently manufactured in large amounts. Moreover, when the reaction step and the cooling step are configured to progress continuously and concurrently, the luminescent nanocarbon can be more efficiently manufactured. Luminescence characteristics may be adjusted by changing the composition of the raw material aqueous solution and the reaction condition in the reaction step, and luminescent nanocarbons having various luminescence characteristics can thereby be manufactured.

BRIEF DESCRIPTION OF DRAWINGS

FIGS. 1(*a*) to 1(*c*) are graphs of emission spectra when irradiating luminescent nanocarbons with excitation light of a wavelength of 405 nm, wherein the luminescent nanocarbons are obtained by changing the time of a reaction step (two hours in FIG. 1(*a*), four hours in FIG. 1(*b*), and eight hours in FIG. 1(*c*)) for Example 1 (0.1 M), Example 2 (0.2 M), and Example 3 (0.5 M).

FIG. 2(*a*) is a graph illustrating dependency of the photoluminescence intensity (PL intensity) of the luminescent nanocarbon of Example 4 on the emission wavelength and the excitation wavelength and FIG. 2(*b*) is a graph illustrating dependency of the PL intensity of the luminescent nanocarbon of Example 5 on the emission wavelength and the excitation wavelength.

FIG. 3 is a substitute photograph for drawing that presents a transmission electron microscopic image (TEM image) of the luminescent nanocarbon of Example 4.

FIG. 4 is a graph illustrating the particle diameter distribution of the luminescent nanocarbon of Example 4.

FIGS. 5(*a*) and 5(*b*) are graphs illustrating dependency of the PL intensity of luminescent nanocarbons on the excitation wavelength and the emission wavelength, wherein FIG. 5(*a*) illustrates Example 6 and FIG. 5(*b*) illustrates Example 7.

FIG. 6 is a graph of emission spectra exhibiting dependency of the PL intensity of the luminescent nanocarbon of Example 8 on the excitation wavelength and the emission wavelength.

FIG. 7 is a substitute photograph for drawing that presents a TEM image of the luminescent nanocarbon of Example 8.

FIG. 8 is a graph illustrating the particle diameter distribution of the luminescent nanocarbon of Example 8.

FIG. 9 is a graph illustrating dependency of the PL intensity of the luminescent nanocarbon of Example 9 on the excitation wavelength and the emission wavelength.

FIG. 10 is a substitute photograph for drawing that presents a TEM image of the luminescent nanocarbon of Example 9.

FIG. 11 is a graph illustrating the particle diameter distribution of the luminescent nanocarbon of Example 9.

FIGS. 12(*a*) to 12(*c*) are graphs of emission spectra exhibiting dependency of the PL intensity of luminescent nanocarbons on the excitation wavelength and the emission wavelength, wherein FIG. 12(*a*) illustrates Example 10, FIG. 12(*b*) illustrates Example 11, and FIG. 12(*c*) illustrates Example 12.

FIG. 13 is a schematic view illustrating the outline of a flow-through-type reaction apparatus used in Examples 13 to 15.

FIG. 14 is a graph illustrating dependency of the PL intensity of the luminescent nanocarbon of Example 13 on the excitation wavelength and the emission wavelength.

FIG. 15 is a substitute photograph for drawing that presents a TEM image of the luminescent nanocarbon of Example 13.

FIG. 16 is a graph illustrating the particle diameter distribution of the luminescent nanocarbon of Example 13.

FIG. 17 is a graph of emission spectra exhibiting dependency of the PL intensity of the luminescent nanocarbon of Example 13 on the excitation wavelength and the emission wavelength.

FIG. 18 is a graph of emission spectra exhibiting dependency of the PL intensity of the luminescent nanocarbon of Example 14 on the excitation wavelength and the emission wavelength.

FIG. 19 is a graph illustrating dependency of the PL intensity of the luminescent nanocarbon of Example 15 on the excitation wavelength and the emission wavelength.

FIG. 20 is a schematic view illustrating the outline of a flow-through-type reaction apparatus used in Examples 17 to 19.

FIGS. 21(*a*) to 21(*c*) are graphs illustrating dependency of the PL intensity of luminescent nanocarbons on the reaction temperature and the emission wavelength, wherein FIG. 21(*a*) illustrates Example 17, FIG. 21(*b*) illustrates Example 18, and FIG. 21(*c*) illustrates Example 19.

FIG. 22 is a graph illustrating emission spectra measured when the reaction product of Example 21 is diluted 250 times and the excitation wavelength is 365 nm.

BEST MODE(S) FOR CARRYING OUT THE INVENTION

One or more embodiments of the method of manufacturing luminescent nanocarbon according to the present invention will be described hereinafter.

The method of the present invention is a method of manufacturing luminescent nanocarbon from a raw material aqueous solution that contains a carbon source compound and a nitrogen source compound.

Examples that can be used as the carbon source compound contained in the raw material aqueous solution include organic acids such as hydroxy acid and saccharic acid, sugars (glucose), and polyvinyl alcohol. Examples of the hydroxy acid include citric acid, malic acid, tartaric acid, galactaric acid (2,3,4,5-tetrahydroxyadipic acid, mucic acid), quinic acid, glyceric acid, gluconic acid, glucuronic acid, ascorbic acid, and gallic acid.

Examples that can be used as the nitrogen source compound contained in the raw material aqueous solution include amine compounds such as aliphatic amine, aromatic amine, hydroxy amine, polyamine, and heterocyclic amine and urea. Examples of the aliphatic amine include monoamines such as hexylamine and N,N-dimethylethylenediamine and diamines such as ethylenediamine. Examples of the aromatic amine include phenylenediamine. Among these, the ethylenediamine which is an aliphatic amine is preferred from the viewpoint that the luminescent nanocarbon with high emission intensity can be synthesized. In an embodiment, the luminescence characteristics of the synthesized luminescent nanocarbon can be readily controlled by changing the concentration of ethylenediamine to adjust the ratio to the carbon source compound.

The method of manufacturing luminescent nanocarbon according to the present embodiment includes a hydrothermal reaction of heating the raw material aqueous solution in a reaction container to react the raw material aqueous solution at a temperature of 100° C. to 500° C. under high pressure and a cooling step of cooling a reaction solution that contains a reaction product generated in the hydrothermal reaction. In the present invention, the raw material aqueous solution refers to an aqueous solution that contains the carbon source compound and the nitrogen source compound, and the reaction solution refers to a solution that contains the reaction product generated from the raw material aqueous solution. A solution in a state in which a part of the carbon source compound and a part of the nitrogen source compound in the raw material aqueous solution react to generate the reaction product, therefore, corresponds to both the raw material aqueous solution and the reaction solution.

The raw material aqueous solution contains water as a solvent for dissolving the carbon source compound and the nitrogen compound. Examples of solvents other than water include alcohols. Since the raw material aqueous solution contains water as a solvent, the reaction step of reacting the carbon source compound and the nitrogen compound is hydrothermal synthesis in which the compound is synthesized under the presence of high-temperature and high-pressure water.

The reaction step is a step of heating the raw material aqueous solution in a state of being closed in the reaction container to synthesize the luminescent nanocarbon as the reaction product which results from the reaction under a reaction temperature of 100° C. or higher and 500° C. or lower. Preferably, the carbon source compound and the nitrogen source compound are reacted under a condition in which the raw material aqueous solution uniformly exists in the reaction container, that is, in the reaction solution (raw material aqueous solution) of a uniform state with a higher pressure than that in the vapor-liquid equilibrium. The uniform state refers to a state in which no steady-state interface exists between the vapor phase and the liquid phase, that is, a state in which no interface exists because the vapor phase and the liquid phase are mixed together or a state in which an interface exists but its position is not fixed and fluctuates.

For example, an example of the state in which no interface exists, among the uniform states, is a state in which the raw material aqueous solution in the reaction container forms a supercritical phase (supercritical fluid) that has both the diffusivity of a vapor and the solubility of a liquid. The supercritical phase of the raw material aqueous solution can be formed by setting the temperature and pressure in the reaction container at a critical temperature or higher and a critical pressure or higher, respectively.

Examples of the state in which the position of an interface is not fixed and fluctuates include a case in which a small amount of bubbles exists in the reaction solution (raw material aqueous solution) in the reaction container. Such a state in which a small amount of bubbles exists in the reaction solution (raw material aqueous solution) may be obtained in some cases, such as when a gas is generated due to a side reaction of the synthesis reaction of the luminescent nanocarbon, and the like.

The temperature (reaction temperature) in the reaction container in the reaction step is set at 100° C. or higher and 500° C. or lower. Setting the reaction temperature at 100° C. or higher can accelerate the hydrothermal reaction. The reaction temperature is more preferably 150° C. or higher and further preferably 200° C. or higher from the viewpoints of improving the conversion rate of the raw material aqueous solution to the luminescent nanocarbon in the reaction step and suppressing the generation of insoluble components of which the luminescence has been lost.

The reaction temperature is generally 500° C. or lower and preferably 400° C. or lower. To suppress the generation of insoluble components due to further progression of the conversion reaction in the reaction step, the reaction temperature is more preferably 300° C. or lower and most preferably 250° C. or lower.

When the reaction step is carried out through a batch-type reaction, the raw material aqueous solution is charged in such an amount that the raw material aqueous solution in the reaction container has a higher density in the reaction step than that in the vapor-liquid equilibrium state. When the luminescent nanocarbon is manufactured through a flow-through-type (continuous-type) reaction, the reaction container is adjusted to such a temperature and pressure that the raw material aqueous solution in the reaction container in the reaction step has a higher density than that in the vapor-liquid equilibrium state. This allows the raw material aqueous solution to be in a uniform state in the reaction step, that is, a state in which the vapor and the liquid are mixed together in the reaction container. The carbon source compound and nitrogen source compound contained in the raw material aqueous solution, therefore, do not have to be in a combination that forms a salt. Thus, the materials are not limited to those, such as citric acid and amine, which form a salt, and any combination of raw materials, such as grape sugar (glucose) and amine, for example, which do not form a salt can be used. Moreover, the reaction can efficiently progress.

The reaction container used in the reaction step has pressure resistance against high-temperature and high-pressure conditions.

When the reaction step is carried out through a batch-type reaction, the entire reaction container charged with the raw material aqueous solution is heated to make the inside of the reaction container as a whole to predetermined temperature and pressure so that the reaction step progresses in the entire reaction container. For example, a tube-type high-pressure container is used as the reaction container, which may be put into an electric furnace set at a predetermined temperature to progress the reaction step.

After completion of the reaction step, the tube-type high-pressure container is taken out to room-temperature air and air-cooled to cool the reaction solution which contains the reaction product (cooling step).

When the reaction step is carried out through a batch-type reaction, the raw material aqueous solution is preferably charged in such an amount that the raw material aqueous solution in the reaction container has a higher density than that in the vapor-liquid equilibrium state. For example, the saturation density of water (liquid phase) is 0.917 g/cm$^3$, 0.864 g/cm$^3$, 0.799 g/cm$^3$, and 0.712 g/cm$^3$ at reaction temperatures of 150° C., 200° C., 250° C., and 300° C., respectively. When the reaction temperature is 200° C. to 250° C., therefore, it is preferred to charge the raw material aqueous solution in an amount that occupies about 90% or more of the volume of the reaction container. The raw material aqueous solution is charged in such an amount thereby to allow the raw material aqueous solution to exist in a uniform state in the reaction step, and the reaction efficiency improves.

When the reaction step is carried out through a continuous reaction, a pressure-resistant reaction container having a long continuous internal space, such as an elongated tube, is used. A part of the reaction container having a sufficient length is heated while being supplied with the raw material aqueous solution from one end of the elongated tube, and the reaction can thereby continuously progress in the partial region to carry out the reaction step. In the reaction step, the pressure in the reaction container is regulated so that the pressure of the raw material aqueous solution becomes higher than the saturated vapor pressure at which the vapor-liquid equilibrium is established. The saturated vapor pressure of water is 0.48 MPa at 150° C., 1.55 MPa at 200° C., 3.98 MPa at 250° C., 8.59 MPa at 300° C., and 16.53 MPa at 350° C. The pressure in the reaction container is therefore regulated to be not lower than the saturated vapor pressure at the reaction temperature. This allows the raw material aqueous solution to exist in a uniform state in the reaction step, and the reaction efficiency thus improves.

Another portion connected to the portion in which the reaction step is carried out is cooled (cooling step) thereby to obtain the luminescent nanocarbon from the reaction solution. The cooling step is carried out, for example, by rapidly cooling a part of the elongated tube, which is the reaction container, using an ice bath or a water bath.

In a configuration in which the reaction step and the cooling step are progressed in different portions of the reaction container and the portion in which the reaction step progresses and the portion in which the cooling step progresses are connected to each other, the raw material aqueous solution and the reaction solution move in the reaction container thereby to allow the reaction step and the cooling step to progress continuously and concurrently.

When the reaction step is carried out in a partial region using the above-described reaction container and the cooling step is carried out in another region, the reaction step and the cooling step progress continuously and concurrently, and a large amount of the luminescent nanocarbon can therefore be efficiently manufactured in a short time.

(Adjustment Step)

The adjustment step is a step of adjusting luminescence characteristics of the luminescent nanocarbon through manufacturing a plurality of luminescent nanocarbons that are obtained by changing at least one of the raw material aqueous solution and the manufacturing condition, and evaluating the luminescence characteristics of the plurality of luminescent nanocarbons. In order to manufacture the luminescent nanocarbon having desired luminescence characteristics, a plurality of luminescent nanocarbons is manufactured and evaluated using different raw materials and/or different manufacturing conditions.

Different raw materials refer to those in which the ratio and/or type (combination) of the carbon source compound and nitrogen source compound contained in the raw material aqueous solution are different. By using different raw materials, luminescent nanocarbons having various luminescence characteristics can be manufactured. For example, when a raw material aqueous solution that contains quinic acid as the carbon source compound and ethylenediamine as the nitrogen source compound is used, luminescent nanocarbon that emits light having substantially the same wavelength can be manufactured regardless of the wavelength of excitation light. Specifically, when excitation light having a wavelength of 320 to 460 nm is used, luminescent nanocarbon having an emission wavelength within a range of 500 to 525 nm can be manufactured. The emission wavelength is a wavelength at which the emission intensity of the emission spectrum of the luminescent nanocarbon is maximum.

The manufacturing conditions refer, for example, to conditions of the reaction step, such as the shape of the reaction container, the flow rate (supply amount) of the reaction solution, heating temperature, heating time, and pressure and conditions of the cooling step, such as cooling temperature and cooling speed, etc. These conditions can also be adjusted thereby to manufacture luminescent nanocarbons having various different luminescence characteristics.

EXAMPLES

Hereinafter, examples of the present invention will be described in which luminescent nanocarbons were manufactured using a batch-type reaction apparatus and a flow-through-type (continuous-type) reaction apparatus.

«Batch-Type Reaction Apparatus»

Example 1

Citric acid (abbreviated as "CA," hereinafter), which is hydroxy acid, was used as the carbon source compound, and ethylenediamine (abbreviated as "EDA," hereinafter) was used as the nitrogen source compound. A raw material aqueous solution containing CA with a concentration of 0.5 M and EDA with a concentration of 0.1 M was used.

[Chemical Formula 1]

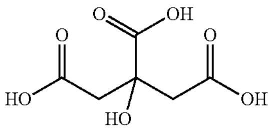

Citric acid (CA)

[Chemical Formula 2]

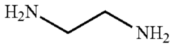

Ethylenediamine (EDA)

A tube-type high-pressure container (reaction container) of SUS316 having an inner volume of about 10 mL was used as the batch-type reactor. The reaction container closed therein with about 9 ml of the raw material aqueous solution was put into an electric furnace and the raw material aqueous solution was reacted at 150° C. for a predetermined time (2 hours, 4 hours, 8 hours) (reaction step). Since the saturation density of water at 150° C. is 0.917 g/cm$^3$, it can be said that, in the reaction step, the raw material solution existed in the reaction container in a substantially uniform state with a higher density than that in the vapor-liquid equilibrium. Thereafter, the reaction container was taken out and then air-cooled (cooling step) to produce luminescent nanocarbon. The heating rate in the heating step was 30° C./min and the cooling rate in the cooling step was −5° C./min.

«Purification Method»

The following method was employed to purify the reaction solution after cooling, containing the luminescent nanocarbon as the reaction product. Dialysis was performed in water for about 24 hours using a dialyzing membrane (MWCO100-500) to remove low-molecular-weight components containing the unreacted raw material aqueous solution, and insoluble components were removed using a syringe filter (pore diameter: 0.22 mm). To observe the TEM image of each example, the luminescent nanocarbon was purified. The emission spectra were measured using unpurified luminescent nanocarbon.

«Measuring Method»

The synthesized luminescent nanocarbon was dispersed in water and the photoluminescence (PL) was measured using a spectrophotofluorometer F-2700 available from Hitachi High-Technologies Corporation. For transmission electron microscope (TEM) measurement, H-7650 available from Hitachi High-Technologies Corporation was used.

Example 2

Luminescent nanocarbon was produced in the same manner as in Example 1 except that a raw material aqueous solution containing CA with a concentration of 0.5 M and EDA with a concentration of 0.2 M was used.

Example 3

Luminescent nanocarbon was produced in the same manner as in Example 1 except that a raw material aqueous solution containing CA with a concentration of 0.5 M and EDA with a concentration of 0.5 M was used.

«Dependency on Amine Concentration and Reaction Time»

FIGS. 1(*a*) to 1(*c*) are graphs of emission spectra when irradiating the luminescent nanocarbons of Example 1 (0.1 M), Example 2 (0.2 M), and Example 3 (0.5 M) with excitation light of a wavelength of 405 nm. In each graph, the vertical axis represents emission intensity and the horizontal axis represents emission wavelength. FIGS. 1(*a*), 1(*b*), and 1(*c*) are graphs illustrating the results of a reaction time of two hours, a reaction time of four hours, and a reaction time of eight hours, respectively. As illustrated in FIG. 1(*a*) to FIG. 1(*c*), the luminescent nanocarbons were obtained with different luminescence characteristics by changing the concentration of EDA with respect to CA and changing the heating time in the reaction step.

Example 4

Luminescent nanocarbon was produced in the same manner as in Example 1 except that a raw material aqueous solution containing 0.5 M of CA as the carbon source compound and 0.8 M of EDA as the nitrogen source compound was used and the reaction step was carried out at 200° C. for two hours.

Example 5

Luminescent nanocarbon was produced in the same manner as in Example 4 except that a raw material aqueous solution containing 0.5 M of CA as the carbon source compound and 0.5 M of EDA as the nitrogen source compound was used.

«Effect by Amine Concentration»

FIGS. 2(*a*) and 2(*b*) are graphs illustrating dependency of the photoluminescence intensity (PL intensity) of the luminescent nanocarbons of Examples 4 and 5 on the emission wavelength and the excitation wavelength. In FIGS. 2(*a*) and 2(*b*), the vertical axis represents the wavelength of excitation light (excitation wavelength) while the horizontal axis represents the emission wavelength, and the shading in the graphs represents the PL intensity.

As illustrated in FIG. 2(*a*), the luminescent nanocarbon of Example 4 synthesized using a raw material aqueous solution having a higher EDA concentration than the CA concentration was excited with ultraviolet light around 370 nm to emit strong blue light around 450 nm.

As illustrated in FIG. 2(*b*), the luminescent nanocarbon of Example 5 synthesized using a raw material aqueous solution having the same CA concentration and EDA concentration was excited with ultraviolet light around 350 nm to emit weakened blue light and also excited with visual light around 450 nm to emit stronger yellow light around 520 nm.

From FIGS. 2(*a*) and 2(*b*), it has been found that the emission characteristics of nanocarbon can be controlled by the composition of the raw material aqueous solution.

«Dependency of Particle Diameter Distribution on EDA Concentration»

FIG. 3 is a substitute photograph for drawing that presents a transmission electron microscopic image (TEM image) of the luminescent nanocarbon of Example 4. FIG. 4 is a graph illustrating the particle diameter distribution of the luminescent nanocarbon of Example 4. In FIG. 4, the horizontal axis represents the particle diameter and the vertical axis represents the frequency of occurrence. From the results of FIGS. 3 and 4, it has been found that the luminescent nanocarbon is obtained with an average particle diameter of 2.1 nm.

The TEM image and the particle diameter distribution of the luminescent nanocarbon of Example 5 are almost the same as those of Example 4, and the particle diameter distribution scarcely depends on the EDA concentration.

Example 6

Luminescent nanocarbon was produced in the same manner as in Example 5 except that a raw material aqueous solution containing 0.5 M of malic acid (abbreviated as "MA") as the carbon source compound and 0.5 M of EDA as the nitrogen source compound was used. The luminescent nanocarbon was purified in the same manner as in Example 1.

[Chemical Formula 3]

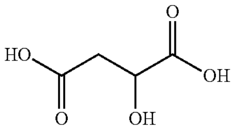

Malic acid (MA)

Example 7

Luminescent nanocarbon was produced in the same manner as in Example 6 except that a raw material aqueous solution containing 0.5 M of tartaric acid (abbreviated as "TA") as the carbon source compound and 0.5 M of EDA as the nitrogen source compound was used. The luminescent nanocarbon was purified in the same manner as in Example 1.

[Chemical Formula 4]

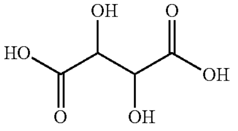

Tartaric acid (TA)

«Effect by Molecular Structure of Hydroxy Acid»

FIG. 5(*a*) is a graph illustrating dependency of the PL intensity of the luminescent nanocarbon of Example 6 on the excitation wavelength and the emission wavelength. Items represented by the vertical axis, the horizontal axis, and the shading are the same as those in FIGS. 2(*a*) and 2(*b*). The luminescent nanocarbon of Example 6 obtained using malic acid as the carbon source compound exhibits emission having a maximum around 400 nm when excided with an excitation wavelength around 320 nm and also exhibits weaker PL than that of the luminescent nanocarbon of Example 5, which is obtained using CA as the raw material, in a shorter wavelength region than that of the luminescent nanocarbon of Example 5.

FIG. 5(*b*) is a graph illustrating dependency of the PL intensity of the luminescent nanocarbon of Example 7 on the excitation wavelength and the emission wavelength. It has been found that the luminescent nanocarbon obtained using tartaric acid as the carbon source compound has an emission wavelength similar to that of the luminescent nanocarbon of Example 6 obtained using malic acid as the carbon source compound but the dark shading, which represents strong emission intensity, appears around 400 nm and the emission intensity is thus stronger than that of Example 6.

In both of them, the average particle size estimated from the TEM image was 2.4 nm. It has thus been found that, even though the particle diameter is the same, the luminescence characteristics of the obtained luminescent nanocarbon vary depending on the molecular structure of the carbon source compound contained in the raw material aqueous solution.

Example 8

Luminescent nanocarbon was produced in the same manner as in Example 5 except that a raw material aqueous solution containing 0.5 M of quinic acid (abbreviated as "QA") as the carbon source compound and 0.5 M of EDA as the nitrogen source compound was used. The luminescent nanocarbon for observing the TEM image was purified in the same manner as in Example 1.

[Chemical Formula 5]

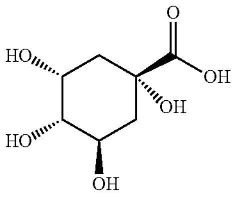

Quinic acid (QA)

Example 9

Luminescent nanocarbon was produced in the same manner as in Example 5 except that a raw material aqueous solution containing 0.5 M of glucose as the carbon source compound and 0.5 M of EDA as the nitrogen source compound was used. The luminescent nanocarbon for observing the TEM image was purified in the same manner as in Example 1.

[Chemical Formula 6]

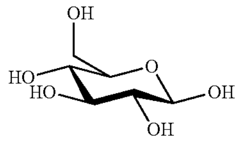

Glucose

Example 10

Luminescent nanocarbon was produced in the same manner as in Example 5 except that a raw material aqueous solution containing 0.5 M of gluconic acid (abbreviated as "GcoA") as the carbon source compound and 0.5 M of EDA as the nitrogen source compound was used.

[Chemical Formula 7]

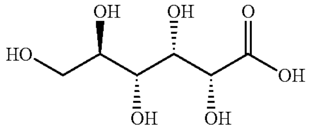

Gluconic acid (GcoA)

Example 11

Luminescent nanocarbon was produced in the same manner as in Example 5 except that a raw material aqueous solution containing 0.5 M of gluconic acid as the carbon source compound and 1.0 M of EDA as the nitrogen source compound was used.

Example 12

Luminescent nanocarbon was produced in the same manner as in Example 5 except that a raw material aqueous solution containing 0.5 M of gluconic acid as the carbon source compound and 2.0 M of EDA as the nitrogen source compound was used.

«Luminescent Nanocarbon with Quinic Acid as Carbon Source Compound»

FIG. 6 is a graph of emission spectra exhibiting dependency of the PL intensity of the luminescent nanocarbon of Example 8 on the excitation wavelength and the emission wavelength. Items represented by the vertical axis and the horizontal axis are the same as those in FIG. 1. Each emission spectrum is illustrated with the wavelength of the excitation light. The luminescent nanocarbon manufactured using the raw material aqueous solution containing quinic acid as the carbon source compound and EDA as the nitrogen source compound exhibited emission of only yellow.

As can be seen from the evaluation results of the luminescent nanocarbons obtained using other raw material aqueous solutions (FIG. 9, FIGS. 12(*a*) to 12(*c*), and FIGS. 17 to 19), the emission wavelength of the luminescent nanocarbon at which the emission intensity is maximum varies in general depending on the wavelength of the excitation light. The use of quinic acid as the carbon source compound allows the luminescent nanocarbon to be obtained in which, when the excitation light having a wavelength of 320 to 460 nm is used, the emission wavelength at which the emission intensity of the emission spectrum is maximum is within a range of 500 to 525 nm irrespective of the wavelength of the excitation light and the emission wavelength is substantially the same, also irrespective of the wavelength of the excitation light. The graph of FIG. 6 illustrates the results when measuring the reaction product without diluting (no dilution).

FIG. 7 is a substitute photograph for drawing that presents a TEM image of the luminescent nanocarbon of Example 8. FIG. 8 is a graph illustrating the particle diameter distribution of the luminescent nanocarbon of Example 8, and items represented by the vertical axis and the horizontal axis are the same as those in FIG. 4. From the results of FIGS. 7 and 8, it has been found that the luminescent nanocarbon is generated with an average diameter of 1.4 nm.

«Luminescent Nanocarbon with Glucose as Carbon Source Compound»

FIG. 9 is a graph of emission spectra exhibiting dependency of the PL intensity of the luminescent nanocarbon of Example 9 on the excitation wavelength and the emission wavelength. Items represented by the vertical axis and the horizontal axis are the same as those in FIG. 1. Each emission spectrum is illustrated with the wavelength of the excitation light. The raw material aqueous solution containing glucose as the carbon source compound and EDA as the nitrogen source compound does not contain a salt of the carbon source compound and the nitrogen source compound, but the luminescent nanocarbon was obtained as in the other examples. The graph of FIG. 9 illustrates the results when measuring the reaction product diluted 1,000 times (×1 k dilution).

FIG. 10 is a substitute photograph for drawing that presents a TEM image of the luminescent nanocarbon of Example 9. FIG. 11 is a graph illustrating the particle diameter distribution of the luminescent nanocarbon of Example 9, and items represented by the vertical axis and the horizontal axis are the same as those in FIG. 4. From the results of FIGS. 10 and 11, it has been found that the luminescent nanocarbon is generated with an average particle diameter of 1.7 nm.

«Dependency of Emission Spectrum on Excitation Wavelength and Amine Concentration»

FIGS. 12(*a*) to 12(*c*) are graphs of emission spectra exhibiting dependency of the PL intensity of luminescent nanocarbons on the excitation wavelength and the emission wavelength. FIG. 12(*a*) illustrates the result of Example 10, FIG. 12(*b*) illustrates the result of Example 11, and FIG. 12(*c*) illustrates the result of Example 12. Items represented by the vertical axis and the horizontal axis are the same as those in FIG. 1. Each emission spectrum is illustrated with the wavelength of the excitation light. The graphs of FIGS. 12(*a*) to 12(*c*) illustrate the results when measuring the reaction products diluted 100 times (×100 dilution).

From FIGS. 12(*a*) to 12(*c*), it has been found that the luminescence characteristics of the luminescent nanocarbon obtained using gluconic acid as the carbon source compound depend on the excitation wavelength and vary in accordance with the concentration of ethylenediamine contained in the raw material aqueous solution.

«Flow-through-type (Continuous-type) Reaction Apparatus»

FIG. 13 is a schematic view illustrating the outline of a flow-through-type reaction apparatus used in Examples 13 to 15. As illustrated in the figure, a SUS316 tube having an outer diameter of ⅛ inch and an inner diameter of 1.8 mm was used as the reaction container, and the raw material aqueous solution was delivered from a reservoir so as to be of a predetermined amount per one minute using a pump. The reactor tube length of a furnace (electric furnace) in which the reaction step in the reaction container would progress was 10 m, and the sample temperature (reaction solution temperature) in the vicinity of the exit of the electric furnace was determined as the reaction temperature. A portion of the reaction container through which the reaction solution after the reaction would flow was rapidly cooled in an ice bath (cooling step), and the pressure was reduced with a back pressure regulator to recover the luminescent nanocarbon solution. When the raw material aqueous solution is supplied in an amount of 5 ml per one minute, the residence time in the furnace is about 4 minutes.

In the flow-through-type reaction apparatus, the pressure in the portion (reaction part) in which the reaction step is carried out is monitored with a pressure gauge and regulated with the back pressure valve so as to be a pressure (about 25 MPa) higher than the saturated vapor pressure.

«Continuous Synthesis by Flow-Through-Type Reactor»

Example 13

Continuous synthesis of luminescent nanocarbon was carried out at a flow rate of 10 mL/min and a reaction temperature of 250° C. using the flow-through-type reaction apparatus of FIG. 13 and using a raw material aqueous solution containing CA with a concentration of 0.5 M and EDA with a concentration of 0.5 M.

«Purification method»

The reaction solution after the cooling step was developed in ethanol, the supernatant liquid was recovered by filtration, and the solvent was then removed to obtain luminescent nanocarbon for TEM measurement. When continuous synthesis is carried out using a raw material aqueous solution of CA:EDA=1:1 as in this example, the reaction product can be purified by the above simple method because unreacted raw materials are not mixed in the reaction product.

Example 14

Continuous synthesis of luminescent nanocarbon was carried out under the same condition as in Example 13 except that the flow rate was 5 mL/min.

Example 15

Continuous synthesis of luminescent nanocarbon was carried out under the same condition as in Example 13 except that the reaction temperature was 300° C.

Example 16

Continuous synthesis of luminescent nanocarbon was carried out under the same condition as in Example 13 except that the reaction temperature was 200° C.

FIG. 14 is a graph of emission spectra exhibiting dependency of the PL intensity of the luminescent nanocarbon of Example 13 on the excitation wavelength and the emission wavelength. Items represented by the vertical axis, the horizontal axis, and the shading are the same as those in FIGS. 2(*a*) and 2(*b*). As illustrated in the figure, the luminescent nanocarbon of Example 13 exhibits strong blue light emission around 450 nm when irradiated with ultraviolet light around 370 nm.

FIG. 15 is a substitute photograph for drawing that presents a TEM image of the luminescent nanocarbon of Example 13. FIG. 16 is a graph illustrating the particle diameter distribution of the luminescent nanocarbon of Example 13, and items represented by the vertical axis and the horizontal axis are the same as those in FIG. 4. From FIGS. 15 and 16, it has been found that the nanocarbon is generated with an average particle diameter of 1.8 nm.

«Reaction Temperature and Yield Rate of Luminescent Nanocarbon»

The yield rate of nanocarbon with respect to the input raw material is about 10% at 200° C. because the reaction does not sufficiently progress, but the yield rate is improved to about 75% at 250° C. Thus, continuous synthesis of about 50 g of the luminescent nanocarbon per one hour has been successfully carried out.

The yield rates of the luminescent nanocarbons obtained in Examples 13 to 16 are listed in the following table. As listed in the table, it has been found that, when the feed rate of the raw material aqueous solution is set at 10 mL per one minute, the yield rate sharply increases as the reaction temperature increases from 200° C. to 250° C. while the yield rate moderately decreases as the reaction temperature further increases from 250° C. to 300° C. From this result, it can be said that the reaction temperature is preferably around 250° C. (about 240° C. to 270° C.) from the viewpoint of yield rate.

TABLE 1

| | Example 16 | Example 13 | Example 15 |
|---|---|---|---|
| Reaction temperature (° C.) | 200 | 250 | 300 |
| Yield rate (%) | 12 | 76 | 49 |

«Flow Rate of Raw Material Aqueous Solution, Reaction Temperature, and Luminescence Characteristics of Luminescent Nanocarbon»

FIGS. 17 to 19 are graphs of emission spectra exhibiting dependency of the PL intensity of the luminescent nanocarbons of Examples 13 to 15 on the excitation wavelength and the emission wavelength. Items represented by the vertical axis and the horizontal axis are the same as those in FIGS. 1(*a*) to 1(*c*). Each emission spectrum is illustrated with the wavelength of the excitation light. As illustrated in these figures, the obtained luminescent nanocarbons have different luminescence characteristics depending on the wavelength of the excitation light.

From the comparison between FIGS. 17 and 18, it has been found that the feed rate of the raw material aqueous solution affects the luminescence characteristics of the luminescent nanocarbon. From the comparison between FIGS. 17 and 19, it has been found that the reaction temperature affects the luminescence characteristics of the luminescent nanocarbon. It has thus been found that luminescent nanocarbons having different luminescence characteristics can be obtained from the same raw material aqueous solution by adjusting the reaction condition such as a flow rate and reaction temperature.

Luminescent nanocarbons were produced using raw material aqueous solutions in which the molar ratio of CA and EDA was 1:1 but the concentration was changed from 0.5 mM to 0.5 M. When the obtained luminescent nanocarbons were diluted so as to have the same raw material concentration and the PL measurement was performed, the difference due to the raw material concentration was only reflected on a small difference in the emission intensity. In other words, the luminescence characteristics of the luminescent nanocarbons scarcely changed even through the raw material concentration of the raw material aqueous solution was significantly changed. From this result, it has been found that, when using raw material aqueous solutions containing CA and EDA at the same molar ratio, the reaction characteristics (luminescence characteristics) of the luminescent nanocarbons are substantially not affected by the concentrations of the carbon source compound and nitrogen source compound contained in the raw material aqueous solutions, provided that the heating condition at the time of the reaction is the same.

As described above, from the comparison between FIG. 17 and FIG. 18, it can be said that the feed rate of the raw material aqueous solution affects the emission characteristics of the light emitting nanocarbon. It can be estimated that this is caused by the change in the heating condition of the reaction step because the residence time (reaction time) in the furnace varies due to the change of flow rate in the flow-through-type reactor. For example, when the flow rate is halved, the residence time is about doubled, so the reaction is carried out under the same heating condition for a long time.

In contrast, even when the concentrations of the carbon source compound and nitrogen source compound in the raw material aqueous solution are changed while the flow rate remains the same, the heating condition (temperature, time) in the reaction step does not change. It can thus be said that the emission characteristics of the obtained luminescent nanocarbons substantially did not change. However, the effect of the raw material concentration in the reaction step can vary depending on the reaction mechanism. When another raw material aqueous solution is used, therefore, nanocarbon having different emission characteristics may be obtained due to the concentration effect in the reaction step.

«Yield of Luminescent Nanocarbon»

When the flow-through-type reaction apparatus illustrated in FIG. 13 was used, about 50 g of the luminescent nanocarbon was able to be manufactured per one hour by supplying 10 mL of 0.5 M of the raw material aqueous solution per one minute and reacting it.

FIG. 19 (FIG. 20) is a schematic view illustrating the outline of a flow-through-type reaction apparatus used in Examples 17 to 19. In the flow-through-type reaction apparatus illustrated in the figure, high-temperature and high-pressure water is supplied by a preheater to reduce the time required for temperature rise in the reaction step. The use of a SUS316 tube having an outer diameter of ⅛ inch and an inner diameter of 1.8 mm as the reaction container was the same as in the apparatus of FIG. 13, but the length of a heater was 2 m. The flow rate of water supplied to the preheater was 4 mL per one minute (4 mL/min).

Example 17

Continuous synthesis of luminescent nanocarbons was carried out at a flow rate of 1 mL/min and predetermined reaction temperatures (200° C., 250° C., 300° C., 340° C., and 380° C.) using the flow-through-type reaction apparatus of FIG. 19 (FIG. 20) and using an aqueous solution containing malic acid with a concentration of 0.1 M and EDA with a concentration of 0.1 M as the raw material aqueous solution.

Example 18

Continuous synthesis of luminescent nanocarbons was carried out at a flow rate of 1 mL/min and predetermined reaction temperatures (200° C., 250° C., 300° C., 340° C., and 380° C.) using the flow-through-type reaction apparatus of FIG. 19 (FIG. 20) and using an aqueous solution containing galactaric acid with a concentration of 0.1 M and EDA with a concentration of 0.1 M as the raw material aqueous solution.

Example 19

Continuous synthesis of luminescent nanocarbons was carried out at a flow rate of 5 mL/min and predetermined reaction temperatures (200° C., 250° C., 275° C., 300° C., 340° C., and 380° C.) using the flow-through-type reaction apparatus of FIG. 19 (FIG. 20) and using an aqueous solution containing tartaric acid with a concentration of 0.1 M and EDA with a concentration of 0.1 M as the raw material aqueous solution.

Example 20

Continuous synthesis was carried out at a flow rate of 5 mL/min and a reaction temperature of 150° C. using the flow-through-type reaction apparatus of FIG. 13 and using an aqueous solution containing glucose with a concentration of 0.5 M and EDA with a concentration of 1.0 M as the raw material aqueous solution, and it was confirmed that luminescent nanocarbon was synthesized.

FIGS. 20(*a*) to 20(*c*) (FIGS. 21(*a*) to 21(*c*)) are graphs illustrating dependency of the PL intensity of luminescent nanocarbons on the emission wavelength and the reaction temperature. FIG. 20(*a*) (FIG. 21(*a*)) illustrates the measurement result of the luminescent nanocarbon of Example 17, FIG. 20(*b*) (FIG. 21(*b*)) illustrates the measurement result of the luminescent nanocarbon of Example 18, and FIG. 20(*c*) (FIG. 21(*c*)) illustrates the measurement result of the luminescent nanocarbon of Example 19. From these figures, it can be found that luminescent nanocarbons having different emission characteristics are obtained depending on the reaction temperature. From the comparison of FIGS. 20(*a*) to 20(*c*) (FIGS. 21(*a*) to 21(*c*)), it has been found that the effect of the reaction temperature on the emission characteristics of the luminescent nanocarbons is not uniform and varies depending on the type of the raw material used as the carbon source compound.

Example 21

Continuous synthesis of luminescent nanocarbons was carried out at predetermined flow rates (4 mL/min and 8 mL/min) and a reaction temperature of 300° C. using the flow-through-type reaction apparatus of FIG. 13 and using aqueous solutions containing citric acid (CA) with a concentration of 0.3 M and urea with predetermined concentrations (0.3 M and 0.6 M) as the raw material aqueous solutions.

FIG. 22 illustrates emission spectra measured when the reaction products of Example 21 are diluted 250 times and the excitation wavelength is 365 nm. As illustrated in the figure, regardless of the content of urea and the feed rate of the raw material aqueous solution, emission spectra having the maximum emission intensity around 440 nm were obtained. With regard to the feed rate of the raw material aqueous solution, luminescent nanocarbons having higher emission intensity were obtained at a feed rate of 4 mL/min than 8 mL/min regardless of the concentration of urea in the raw material aqueous solution. On the other hand, with regard to the concentration of urea in the raw material aqueous solution, when the feed rate of the raw material aqueous solution was 4 mL/min, luminescent nanocarbon having higher emission intensity was obtained at a concentration of urea of 0.3 M than 0.6 M, while when the feed rate was 8 mL/min, luminescent nanocarbon having higher emission intensity was obtained at a concentration of urea of 0.6 M than 0.3 M.

INDUSTRIAL APPLICABILITY

The present invention can be utilized as a method of manufacturing luminescent nanocarbons to be used for lighting, displays, optical communication devices, fluorescent probes for biological objects which are required to have low toxicity, etc.

The invention claimed is:

1. A method of manufacturing luminescent nanocarbon from a raw material aqueous solution comprising a carbon source compound and a nitrogen source compound, the method comprising:

performing a hydrothermal reaction by heating the raw material aqueous solution in a reaction container so as to react the raw material aqueous solution at a reaction temperature of 100° C. or higher and 500° C. or lower;

cooling a reaction solution comprising a reaction product generated from the raw material aqueous solution in the hydrothermal reaction; and adjusting luminescence characteristics of the luminescent nanocarbon through manufacturing a plurality of luminescent nanocarbons and evaluating the luminescence characteristics of the plurality of luminescent nanocarbons, wherein the carbon source compound is at least one material selected from the group consisting of gluconic acid, quinic acid, and glucose, and the nitrogen source compound is ethylenediamine, and the plurality of luminescent nanocarbons are obtained by changing at least one condition selected from the group consisting of the raw material aqueous solution and manufacturing conditions of the plurality of luminescent nanocarbons.

2. The method of manufacturing luminescent nanocarbon as recited in claim 1, wherein the hydrothermal reaction is carried out under a condition in which the raw material aqueous solution uniformly exists in the reaction container.

3. A method of manufacturing luminescent nanocarbon from a raw material aqueous solution comprising a carbon source compound and a nitrogen source compound, the method comprising:

performing a hydrothermal reaction by heating the raw material aqueous solution in a reaction container to react the raw material aqueous solution at a reaction temperature of 100° C. or higher and 500° C. or lower; and cooling a reaction solution comprising a reaction product generated from the raw material aqueous solution in the hydrothermal reaction, wherein the hydrothermal reaction and the cooling progress in different portions of the reaction container, a portion in which the hydrothermal reaction progresses and a portion in which the cooling progresses are connected to each other, and the raw material aqueous solution and the reaction solution move in the reaction container thereby to allow the hydrothermal reaction and the cooling to progress continuously and concurrently.

4. The method of manufacturing luminescent nanocarbon as recited in claim 3, wherein the reaction temperature is in a range of 200° C. or higher and 400° C. or lower.

5. The method of manufacturing luminescent nanocarbon as recited in claim 1, wherein the plurality of luminescent nanocarbons is manufactured from the raw material aqueous solution in which a ratio of the carbon source compound and the nitrogen source compound is different.

6. The method of manufacturing luminescent nanocarbon as recited in claim 1, wherein the plurality of luminescent nanocarbons is manufactured from a plurality of raw material aqueous solutions in which a combination of the carbon source compound and the nitrogen source compound is different.

7. The method of manufacturing luminescent nanocarbon as recited in claim 1, wherein the plurality of luminescent nanocarbons is manufactured with different reaction temperatures in the hydrothermal reaction.

* * * * *